US012560982B2

(12) United States Patent
Koide et al.

(10) Patent No.: US 12,560,982 B2
(45) Date of Patent: Feb. 24, 2026

(54) DETECTION DEVICE

(71) Applicant: Japan Display Inc., Tokyo (JP)

(72) Inventors: Gen Koide, Tokyo (JP); Takashi Nakamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/907,714

(22) Filed: Oct. 7, 2024

(65) Prior Publication Data

US 2025/0028370 A1    Jan. 23, 2025

Related U.S. Application Data

(63) Continuation of application No. PCT/JP2023/013924, filed on Apr. 4, 2023.

(30) Foreign Application Priority Data

Apr. 11, 2022    (JP) ................................. 2022-065318

(51) Int. Cl.
*G06F 1/16*    (2006.01)

(52) U.S. Cl.
CPC ............ *G06F 1/1684* (2013.01); *G06F 1/163* (2013.01); *G06F 1/1635* (2013.01)

(58) Field of Classification Search
CPC ....... G06F 1/1684; G06F 1/163; G06F 1/1635
See application file for complete search history.

(56) References Cited

U.S. PATENT DOCUMENTS

| | | | |
|---|---|---|---|
| 2009/0027358 A1 | 1/2009 | Hosono | |
| 2020/0052216 A1 | 2/2020 | Mitchell et al. | |
| 2021/0066628 A1* | 3/2021 | Park ...................... H10K 30/85 |
| 2023/0000375 A1 | 1/2023 | Ikuta et al. | |
| 2023/0113714 A1* | 4/2023 | Vallius ................. A61B 5/0816 |
| | | | 398/25 |

FOREIGN PATENT DOCUMENTS

| | | |
|---|---|---|
| JP | 2007-330708 A | 12/2007 |
| JP | 2009-032005 A | 2/2009 |
| WO | WO2021/124749 A1 | 6/2021 |

OTHER PUBLICATIONS

Search Report issued in related International Patent Application No. PCT/JP2023/013924 mailed on Jun. 27, 2023 and English translation of same. 5 pages.

* cited by examiner

*Primary Examiner* — Robert J Michaud
(74) *Attorney, Agent, or Firm* — K&L Gates LLP

(57) ABSTRACT

According to an aspect, a detection device includes: a ring-shaped housing; a light source provided in the housing; a first optical sensor provided in the housing so as to be adjacent to one end of the light source in a circumferential direction of the housing; and a second optical sensor provided in the housing so as to be adjacent to the other end of the light source in the circumferential direction of the housing. At least the first optical sensor is an organic photodiode including a sensor substrate, a lower electrode, a lower buffer layer, an active layer, an upper buffer layer, and an upper electrode.

13 Claims, 15 Drawing Sheets

FIG.4

FIG.5
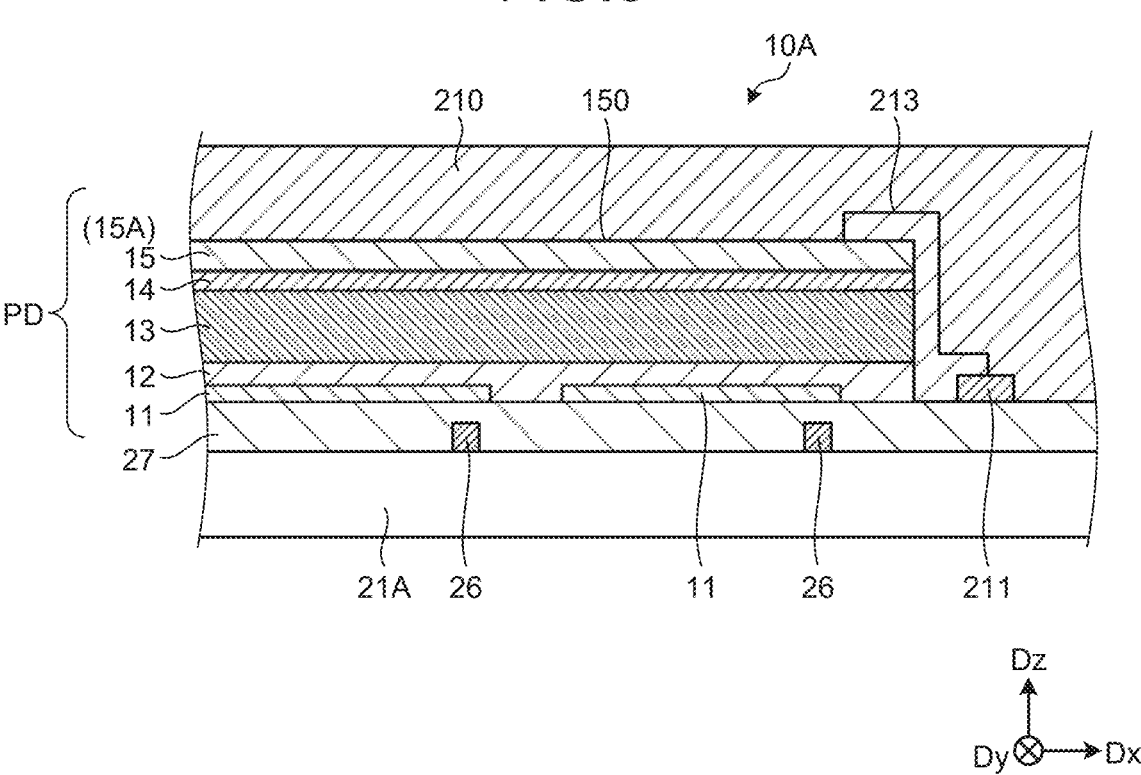
FIG.6
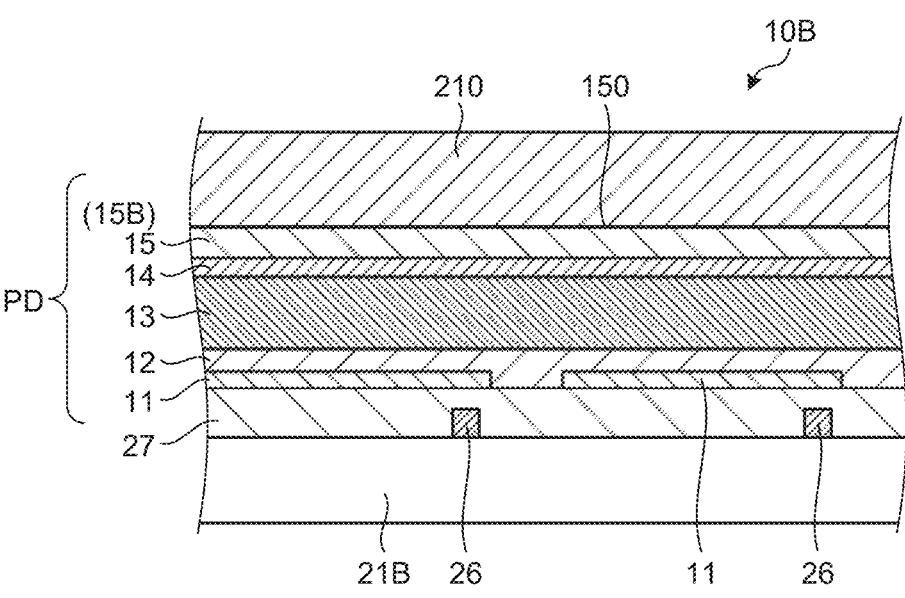
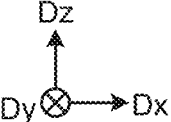

FIG.16

DETECTION DEVICE

CROSS-REFERENCE TO RELATED APPLICATION

This application claims the benefit of priority from Japanese Patent Application No. 2022-065318 filed on Apr. 11, 2022 and International Patent Application No. PCT/JP2023/013924 filed on Apr. 4, 2023, the entire contents of which are incorporated herein by reference.

BACKGROUND

1. Technical Field

What is disclosed herein relates to a detection device.

2. Description of the Related Art

Optical sensors capable of detecting fingerprint patterns and vein patterns are known (refer to, for example, Japanese Patent Application Laid-open Publication No. 2009-032005). Among such optical sensors, sensors are known each including a plurality of photodiodes in which an organic semiconductor material is used as an active layer. The organic semiconductor material is disposed between lower and upper electrodes, and signal lines are electrically coupled to the lower electrodes of the photodiodes to output detection signals to a detection circuit.

In a case of a configuration in which an optical sensor is provided in a ring-shaped housing to detect light from a light source, if the optical sensor is provided only on one side of the light source, the light traveling toward the other side of the light source cannot be detected by the optical sensor, thus being wasted. Therefore, conventional detection devices that include a ring-shaped housing are required to be improved in accuracy of detection of light from a light source.

For the foregoing reasons, there is a need for a detection device that can improve the accuracy of detection of light from a light source using a ring-shaped housing.

SUMMARY

According to an aspect, a detection device includes: a ring-shaped housing; a light source provided in the housing; a first optical sensor provided in the housing so as to be adjacent to one end of the light source in a circumferential direction of the housing; and a second optical sensor provided in the housing so as to be adjacent to the other end of the light source in the circumferential direction of the housing. At least the first optical sensor is an organic photodiode including a sensor substrate, a lower electrode, a lower buffer layer, an active layer, an upper buffer layer, and an upper electrode.

BRIEF DESCRIPTION OF THE DRAWINGS

FIG. 4 is a configuration diagram illustrating an exemplary configuration of a first optical sensor and a second optical sensor illustrated in FIG. 3;

FIG. 5 is a schematic sectional view illustrating an exemplary multilayer configuration of the optical sensor taken along section B-B illustrated in FIG. 4;

FIG. 6 is a schematic sectional view illustrating an exemplary multilayer configuration of the optical sensor taken along section C-C illustrated in FIG. 4;

FIG. 16 is a configuration diagram illustrating an exemplary configuration of a first optical sensor and a second optical sensor according to a modification of the second embodiment.

DETAILED DESCRIPTION

Figure 1:
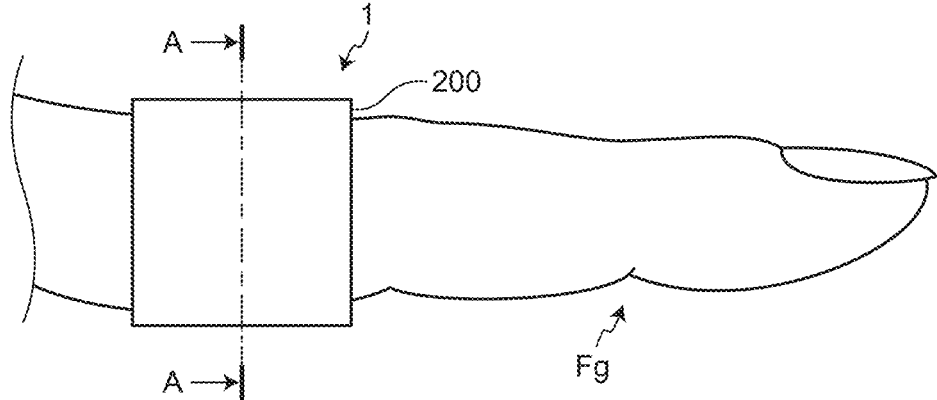
FIG. 1 is a schematic view illustrating an exemplary external appearance when a state of a finger accommodated inside a detection device according to a first embodiment is viewed from a lateral side of a housing.

The following describes modes (embodiments) for carrying out the disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present specification and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

Detection Device

Figure 2:
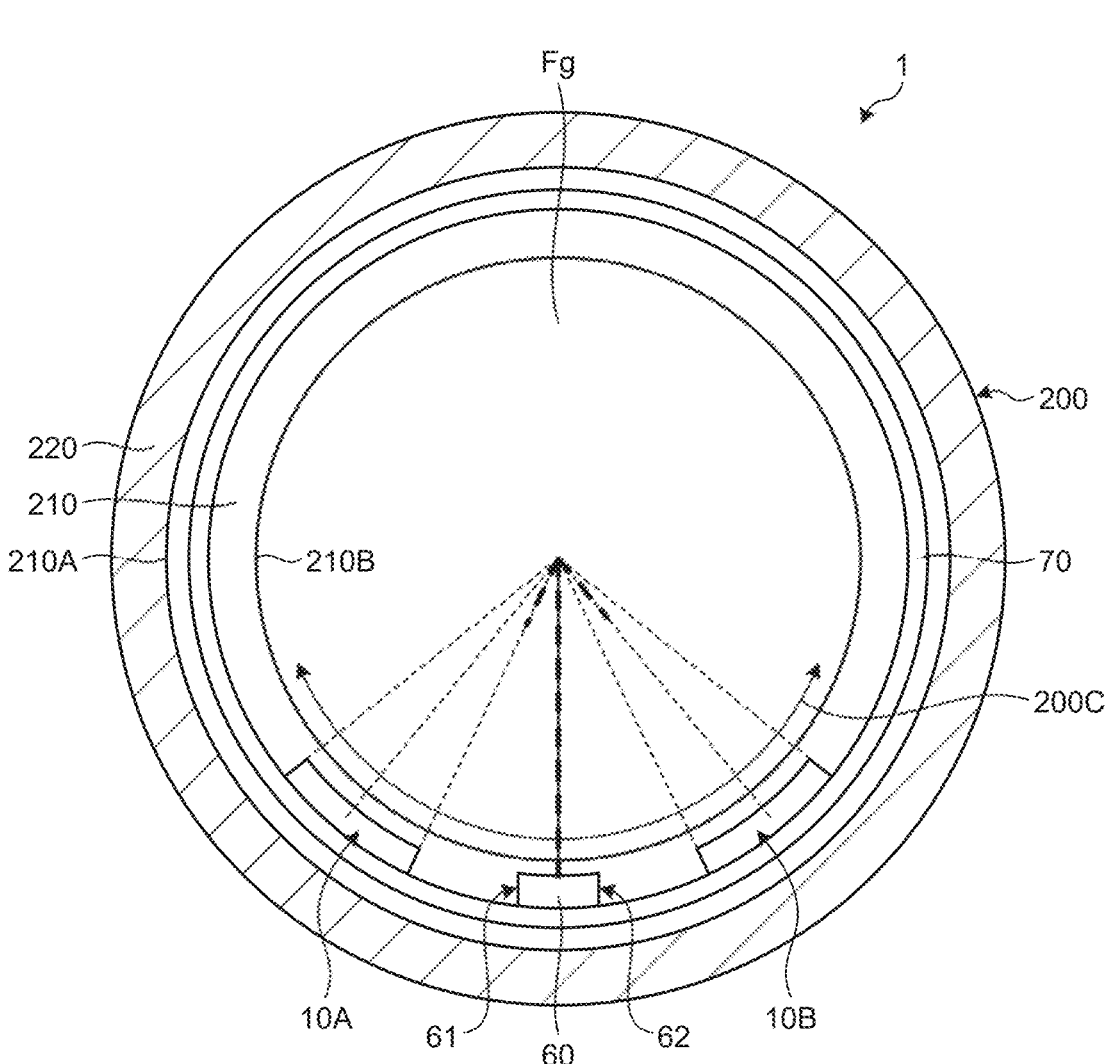
FIG. 2 is a schematic sectional view taken along section A-A illustrated in FIG. 1.
Figure 3:
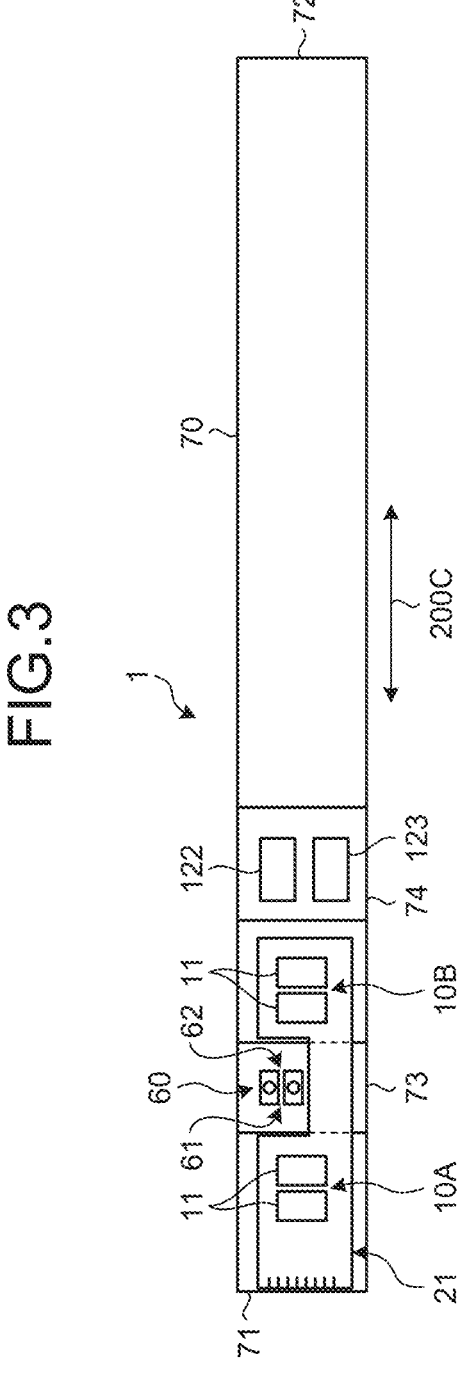
FIG. 3 is a development view illustrating an exemplary development of optical sensors of the detection device illustrated in FIG. 1.
Figure 4:
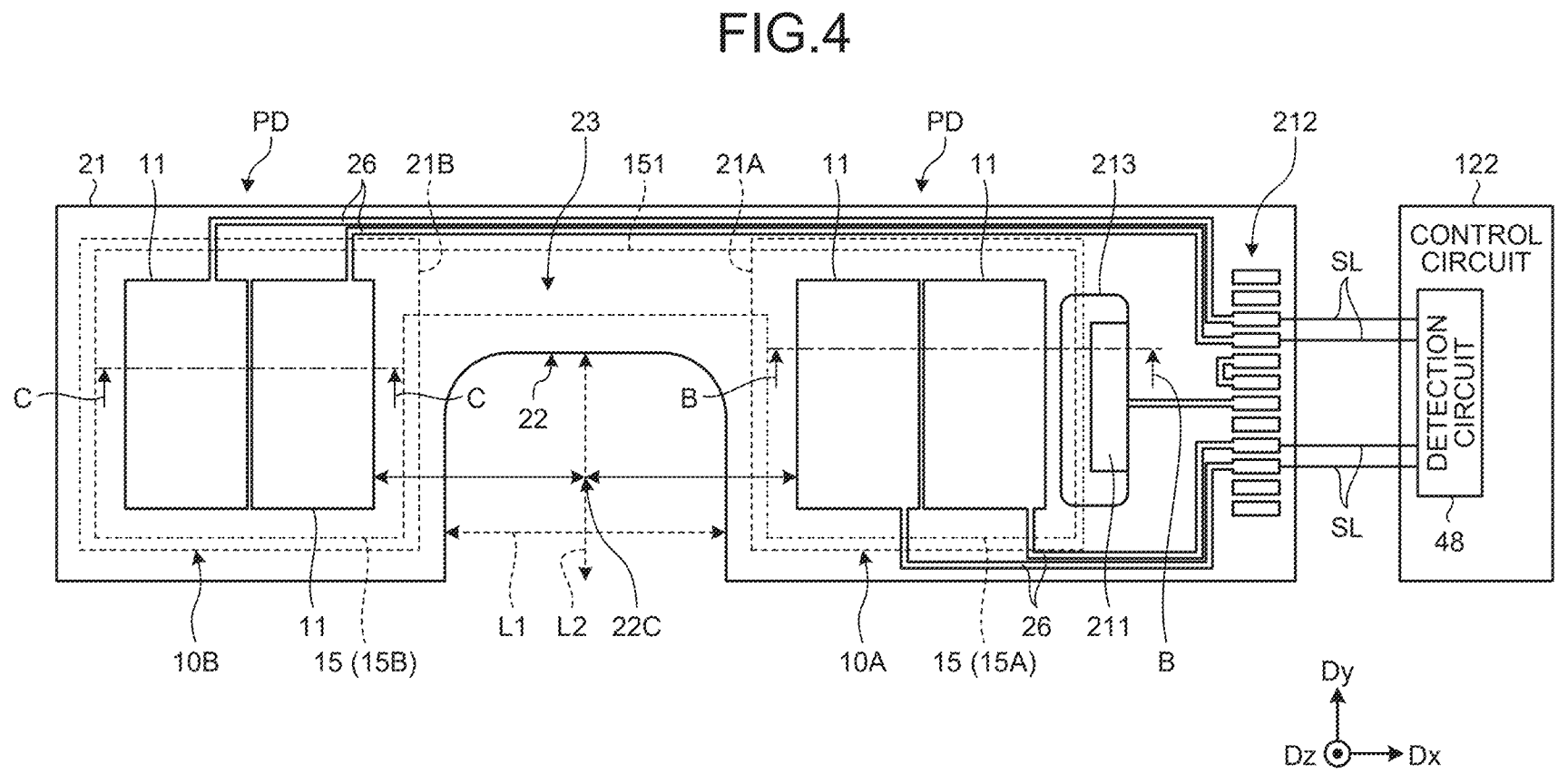

FIG. 1 is a schematic view illustrating an exemplary external appearance when a state of a finger accommodated inside a detection device according to a first embodiment is viewed from a lateral side of a housing. FIG. 2 is a schematic sectional view taken along section A-A illustrated in FIG. 1. FIG. 3 is a development view illustrating an exemplary development of optical sensors of the detection device illustrated in FIG. 1. FIG. 4 is a configuration diagram illustrating an exemplary configuration of a first optical sensor and a second optical sensor illustrated in FIG. 3. FIG. 5 is a schematic sectional view illustrating an exemplary multilayer configuration of the optical sensor taken along section B-B illustrated in FIG. 4. FIG. 6 is a schematic sectional view illustrating an exemplary multilayer configuration of the optical sensor taken along section C-C illustrated in FIG. 4.

A detection device 1 illustrated in FIG. 1 is a finger ring-shaped device that can be worn on and removed from a human body and is worn on a finger Fg of the human body. Examples of the finger Fg include a thumb, an index finger, a middle finger, a ring finger, and a little finger. The human body is a person to be authenticated whose identity is verified by the detection device 1. The detection device 1 can detect biometric information on a living body from the finger Fg wearing the detection device 1. The finger Fg is an example of a measurement target. The measurement target is the living body or a part of the living body, and is an object to be measured. The detection device 1 is made into a finger ring or a wristband so as to be easily carried by a user. In the following description, the detection device 1 is assumed to be used as a finger ring.

As illustrated in FIG. 2, the detection device 1 includes a housing 200, a light source 60, a first optical sensor 10A, and a second optical sensor 10B. The detection device 1 is a device that includes a battery (not illustrated) in the housing 200 and is operated by power from the battery.

The housing 200 is formed in a ring shape (annular shape) that can be worn on the finger Fg, and is a wearable member to be worn on the living body. In the example illustrated in FIG. 2, the housing 200 includes a first housing 210 and a second housing 220. The first housing 210 is integrated with the second housing 220 to form the housing 200 into a ring shape. The first housing 210 is a member that makes contact with the human body wearing the housing 200. The first housing 210 accommodates therein the light source 60, the first optical sensor 10A, the second optical sensor 10B, and so forth. The first housing 210 is formed into a ring shape using a housing material such as a light-transmitting synthetic resin or silicon. The second housing 220 has a surface of the housing 200 that covers an outer peripheral surface 210A of the first housing 210. The second housing 220 is formed into a ring shape using a member of, for example, a metal or a non-light-transmitting synthetic resin. The first housing 210 of the housing 200 accommodates therein a flexible printed circuit board 70 on which the light source 60, the first optical sensor 10A, the second optical sensor 10B, and so forth are mounted. The flexible printed circuit board 70 is accommodated in the housing 200, for example, by forming the housing 200 by filling the periphery of the flexible printed circuit board 70 formed into a ring shape with a filling member in a mold.

As illustrated in FIG. 3, the flexible printed circuit board 70 is formed into a deformable band shape and is formed into the ring shape by coupling one end 71 to the other end 72. The flexible printed circuit board 70 has a first mounting area 73 and a second mounting area 74. The first mounting area 73 is an area where the light source 60 and so forth are mounted. The second mounting area 74 is an area where a control circuit 122, a power supply circuit 123, and so forth are mounted. A sensor substrate 21 is mounted on the flexible printed circuit board 70 so as to extend across the vicinity of the light source 60 in the first mounting area 73. The flexible printed circuit board 70 electrically couples the light source 60, the first optical sensor 10A, the second optical sensor 10B, and so forth to the control circuit 122.

In the present embodiment, the first and the second optical sensors 10A and 10B are provided so as to interpose the light source 60 therebetween in a circumferential direction 200C. That is, in the detection device 1, the first optical sensor 10A, the light source 60, and the second optical sensor 10B are arranged in this order in the circumferential direction 200C. The first and the second optical sensors 10A and 10B are arranged so as to interpose the light source 60 therebetween in the circumferential direction 200C. Thereby, light emitted by the light source 60 can be detected over a wide area of the housing 200. The sensor substrate 21 is an insulating substrate and is formed of, for example, a film-like resin and formed into a band shape. The sensor substrate 21 is a deformable substrate on which the first and the second optical sensors 10A and 10B are mounted. When the sensor substrate 21 is mounted on the flexible printed circuit board 70, the first and the second optical sensors 10A and 10B are positioned on opposite sides of the light source 60 in the circumferential direction 200C of the housing 200. The sensor substrate 21 has a first area 21A in which the first optical sensor 10A is mounted, and a second area 21B in which the second optical sensor 10B is mounted. The sensor substrate 21 is formed as one substrate having the first area 21A and the second area 21B.

In the present embodiment, as illustrated in FIG. 2, the flexible printed circuit board 70 is accommodated in the housing 200 such that a surface provided with the first optical sensor 10A, the second optical sensor 10B, and the light source 60 faces an inner peripheral surface 200B of the housing 200. When the flexible printed circuit board 70 has a light-transmitting property, the first optical sensor 10A, the second optical sensor 10B, and the light source 60 may be mounted on the back surface opposite the front surface. In this case, the light source 60 only needs to be disposed such that light is emitted toward the flexible printed circuit board 70 and light transmitted through the flexible printed circuit board 70 is emitted toward outside the housing 200.

As illustrated in FIG. 2, the light source 60 is provided in the first housing 210 of the housing 200 and is configured to be capable of emitting light toward the center of the housing 200. For example, inorganic light-emitting diodes (LEDs) or organic electroluminescent (EL) diodes (organic light-emitting diodes (OLEDs)) are used as the light source 60. The light source 60 emits light having predetermined wavelengths. In the present embodiment, the light source 60 includes a plurality of light sources so as to be capable of emitting near-infrared light, red light, and green light.

The light emitted from the light source 60 is reflected by a surface of an object to be detected, such as the finger Fg, and enters the first and the second optical sensors 10A and 10B. Thereby, the detection device 1 can detect a fingerprint by detecting a shape of asperities on the surface of the finger Fg or the like. Alternatively, the light emitted from the light source 60 may be reflected in the finger Fg or the like, or transmitted through the finger Fg or the like and enter the first and the second optical sensors 10A and 10B. Thereby, the detection device 1 can detect the information on the living body in the finger Fg or the like. Examples of the information on the living body include, but are not limited to, pulse waves, pulsation, and a vascular image of the finger or a palm. That is, the detection device 1 may be configured as a fingerprint detection device that detects the fingerprint or a vein detection device that detects a pattern of blood vessels such as veins.

Each of the first and the second optical sensors 10A and 10B detects the light emitted by the light source 60 and reflected by the finger Fg, light directly incident on the optical sensor, and other light. The first and the second optical sensors 10A and 10B are each an organic photodiode (OPD). The first optical sensor 10A is provided in the housing 200 so as to be adjacent to one end 61 of the light source 60 in the circumferential direction 200C of the housing 200. The second optical sensor 10B is provided in the housing 200 so as to be adjacent to another end 62 of the light source 60 in the circumferential direction 200C of the housing 200.

As illustrated in FIG. 3, the first and the second optical sensors 10A and 10B each have a photodiode PD (refer to FIG. 4) that is an organic photodiode. Each of the first and the second optical sensors 10A and 10B has a configuration with two lower electrodes 11 arranged along the circumferential direction 200C. The first and the second optical sensors 10A and 10B are mounted on one sensor substrate 21 and are electrically coupled to the flexible printed circuit board 70 via the sensor substrate 21. The sensor substrate 21 has a notch 22 between the first and the second optical sensors 10A and 10B in the circumferential direction 200C of the housing 200. The notch 22 will be described later.

In the following description, a first direction Dx is one direction in a plane parallel to the sensor substrate 21 and is the same direction as the circumferential direction 200C. A second direction Dy is one direction in a plane parallel to the sensor substrate 21 and is a direction orthogonal to the first direction Dx. The second direction Dy may non-orthogonally intersect the first direction Dx. A third direction Dz is a direction orthogonal to the first direction Dx and the second direction Dy. The third direction Dz is a direction normal to the sensor substrate 21. The term "plan view" refers to a positional relation when viewed in a direction orthogonal to the sensor substrate 21.

As illustrated in FIG. 4, the first optical sensor 10A has a configuration in which the two lower electrodes 11 arranged in the first direction Dx and one upper electrode 15A are stacked together. The second optical sensor 10B has a configuration in which the two lower electrodes 11 arranged in the first direction Dx and one upper electrode 15B are stacked together. The upper electrode 15 includes the upper electrode 15A of the first optical sensor 10A and the upper electrode 15B of the second optical sensor 10B. Each of the upper electrode 15A and the upper electrode 15B covers the two lower electrodes 11 in plan view. The upper electrode 15A is electrically coupled to the upper electrode 15B by an electrode connector 151. The upper electrodes 15A and 15B and the electrode connector 151 are integrally formed.

The sensor substrate 21 includes a power supply electrode 211 extending along the second direction Dy. The power supply electrode 211 is electrically coupled to a coupler 212 (terminal) of the sensor substrate 21 and is supplied with a sensor power supply signal (sensor power supply voltage) from the power supply circuit 123 (refer to FIG. 3) via the coupler 212. The upper electrode 15 is electrically coupled to the power supply electrode 211 by a conductive member 213. The conductive member 213 is provided on the sensor substrate 21 so as to extend overlapping both the upper electrode 15 and the power supply electrode 211, and is made of a conductive material. With this configuration, the upper electrode 15 is supplied with the sensor power supply signal from the power supply circuit 123 via the power supply electrode 211.

As illustrated in FIG. 5, the first optical sensor 10A includes the sensor substrate 21 (first area 21A) and the photodiode PD. In the present embodiment, the first optical sensor 10A further includes wiring lines 26 and an insulating layer 27.

The wiring lines 26 are provided on the upper surface of the first area 21A. The wiring lines 26 are each a shield layer formed of, for example, metal wiring, and is formed of a material having better conductivity than the lower electrodes 11 of the photodiode PD. The wiring lines 26 are provided in a layer between the sensor substrate 21 and the photodiode PD in the third direction Dz. The wiring lines 26 are electrically coupled to the coupler 212 on the sensor substrate 21 (refer to FIG. 4). The wiring lines 26 may be formed, for example, in the same layer as the lower electrodes 11, or formed of metal. The insulating layer 27 is provided on the sensor substrate 21 so as to cover the wiring lines 26. The insulating layer 27 may be an inorganic insulating film or an organic insulating film.

The photodiode PD is provided on the insulating layer 27. The photodiode PD includes the lower electrodes 11, a lower buffer layer 12, an active layer 13, an upper buffer layer 14, and the upper electrode 15 (15A). In the photodiode PD, the lower electrodes 11, the lower buffer layer 12 (hole transport layer), the active layer 13, the upper buffer layer 14 (electron transport layer), and the upper electrode 15 are stacked in this order in the third direction Dz orthogonal to the sensor substrate 21.

Each of the lower electrodes 11 is an anode electrode of the photodiode PD and is formed of a light-transmitting conductive material such as indium tin oxide (ITO), for example. The active layer 13 changes in characteristics (such as voltage-current characteristics and resistance value) according to light emitted thereto. An organic material is used as a material of the active layer 13. Specifically, the active layer 13 has a bulk heterostructure containing a mixture of a p-type organic semiconductor and an n-type fullerene derivative ((6,6)-phenyl-$C_{61}$-butyric acid methyl ester (PCBM)) that is an n-type organic semiconductor. As the active layer 13, low-molecular-weight organic materials can be used including, for example, fullerene ($C_{60}$), phenyl-$C_{61}$-butyric acid methyl ester (PCBM), copper phthalocyanine (CuPc), fluorinated copper phthalocyanine ($F_{16}$CuPc), 5,6,11,12-tetraphenyltetracene (rubrene), and perylene diimide (PDI) (derivative of perylene).

The active layer 13 can be formed by a vapor deposition process (dry process) using any of the low-molecular-weight organic materials listed above. In this case, the active layer 13 may be, for example, a multilayered film of CuPc and $F_{16}CuPc$, or a multilayered film of rubrene and $C_{60}$. The active layer 13 can also be formed by a coating process (wet process). In this case, the active layer 13 is made using a material obtained by combining any of the above-listed low-molecular-weight organic materials with a high-molecular-weight organic material. As the high-molecular-weight organic material, for example, poly(3-hexylthiophene) (P3HT) and F8-alt-benzothiadiazole (F8BT) can be used. The active layer 13 can be a film made of a mixture of P3HT and PCBM, or a film made of a mixture of F8BT and PDI.

The lower buffer layer 12 is the hole transport layer. The upper buffer layer 14 is the electron transport layer. The lower buffer layer 12 and the upper buffer layer 14 are provided to facilitate holes and electrons generated in the active layer 13 to reach the lower electrodes 11 or the upper electrode 15. The lower buffer layer 12 (hole transport layer) is in direct contact with the tops of the lower electrodes 11 and is also provided in an area between the adjacent lower electrodes 11. The active layer 13 is in direct contact with the top of the lower buffer layer 12. The material of the hole transport layer is a metal oxide layer. For example, tungsten oxide ($WO_3$) or molybdenum oxide is used as the metal oxide layer.

The upper buffer layer 14 (electron transport layer) is in direct contact with the top of the active layer 13, and the upper electrode 15 is in direct contact with the top of the upper buffer layer 14. Polyethylenimine ethoxylated (PEIE) is used as a material of the electron transport layer.

The materials and the manufacturing methods of the lower buffer layer 12, the active layer 13, and the upper buffer layer 14 are merely exemplary, and other materials and manufacturing methods may be used. For example, each of the lower buffer layer 12 and the upper buffer layer 14 is not limited to a single-layer film, and may be formed as a multilayered film that includes an electron blocking layer and a hole blocking layer.

The upper electrode 15 is provided on the upper buffer layer 14. The upper electrode 15 is a cathode electrode of the photodiode PD and is continuously formed over the entire first and second optical sensors 10A and 10B. In other words, the upper electrode 15 is continuously provided on the photodiodes PD. The upper electrode 15 faces the lower electrodes 11 with the lower buffer layer 12, the active layer 13, and the upper buffer layer 14 interposed therebetween. The upper electrode 15 is formed of, for example, a light-transmitting conductive material such as ITO or indium zinc oxide (IZO). A portion of an end of an upper surface 150 of the upper electrode 15 is electrically coupled to the conductive member 213. In the first optical sensor 10A, the photodiode PD is well sealed by providing the first housing 210 on the upper electrode 15 and so forth.

As illustrated in FIG. 6, the second optical sensor 10B includes the lower electrodes 11 of the second optical sensor 10B in the second area 21B of the sensor substrate 21 different from the area for the lower electrodes 11 of the first optical sensor 10A. The lower electrodes 11 are covered with the lower buffer layer 12, the active layer 13, the upper buffer layer 14, and the upper electrode 15 (15B). In the present embodiment, the second optical sensor 10B includes the sensor substrate 21 (second area 21B), the photodiode PD, the wiring lines 26, and the insulating layer 27. The photodiode PD, the wiring lines 26, and the insulating layer 27 have the same configuration as that of the photodiode PD, the wiring lines 26, and the insulating layer 27 of the first optical sensor 10A described above. That is, the photodiode PD of the second optical sensor 10B includes the lower electrodes 11, the lower buffer layer 12, the active layer 13, the upper buffer layer 14, and the upper electrode 15 (15B). In the present embodiment, the first and the second optical sensors 10A and 10B are organic photodiodes.

As illustrated in FIG. 4, the sensor substrate 21 has the first area 21A of the first optical sensor 10A and the second area 21B of the second optical sensor 10B, and is integrally formed in one common substrate. The sensor substrate 21 has the notch 22 formed between the first area 21A of the first optical sensor 10A and the second area 21B of the second optical sensor 10B in the first direction Dx. The sensor substrate 21 includes the notch 22 and a joint 23, the notch 22 is provided between the first optical sensor 10A and the second optical sensor 10B, and the joint 23 is adjacent to the notch 22 and lies between the first and the second optical sensors 10A and 10B.

The notch 22 is formed to have a length L1 longer than the length of the light source 60 in the first direction Dx. The notch 22 is formed to have a length L2 longer than the length of the light source 60 and shorter than the length (width) of the sensor substrate 21 in the second direction Dy. The notch 22 is formed such that the distance between a center 22C and one side of the lower electrode 11 of the first optical sensor 10A is equal to the distance between the center 22C and one side of the lower electrode 11 of the second optical sensor 10B in the first direction Dx. The sensor substrate 21 is integrally formed by connecting the first optical sensor 10A to the second optical sensor 10B via the joint 23 at the notch 22. The lower buffer layer 12, the active layer 13, the upper buffer layer 14, and the electrode connector 151 of the upper electrodes 15 are arranged at the joint 23. With this configuration, the joint 23 integrally forms the upper electrodes 15 of the first optical sensor 10A and the second optical sensor 10B. The notch 22 is formed in a shape that allows the light source 60 to be located therein. In the present embodiment, the notch 22 is formed into a substantially rectangular shape in plan view, but may have a semicircular, triangular, polygonal, or other shape, for example. The electrode connector 151 is provided on the joint 23 of the sensor substrate 21 so as to be stacked on the upper buffer layer 14, the active layer 13, and the lower buffer layer 12.

The plurality of wiring lines 26 of the sensor substrate 21 are coupled to a detection circuit 48 included in the control circuit 122 via a plurality of signal lines SL of the flexible printed circuit board 70. In other words, the detection circuit 48 is electrically coupled to the lower electrodes 11 of the first and the second optical sensors 10A and 10B via the signal lines SL. The detection circuit 48 may be formed as a circuit separate from the control circuit 122.

The control circuit 122 is a circuit that controls detection operations by supplying control signals to the photodiodes PD. Each of the photodiodes PD outputs an electrical signal corresponding to the light emitted thereto as a detection signal Vdet to the detection circuit 48. In the present embodiment, the detection signals Vdet of the photodiodes PD are sequentially output to the detection circuit 48 in a time-division manner. In other words, the signal lines SL are sequentially electrically coupled to the detection circuit 48 in a time-division manner. Thereby, the detection device 1 detects information on the object to be detected based on the detection signals Vdet from the photodiodes PD.

The configuration example of the detection device 1 according to the present embodiment has been described above. The configuration described above using FIGS. 1 to 6 is merely an example, and the configuration of the detection device 1 according to the present embodiment is not limited to the example. The configuration of the detection device 1 according to the present embodiment can be flexibly modified according to requirements and/or operations.

Example of Detection by Detection Device Worn on Finger

Figure 7:
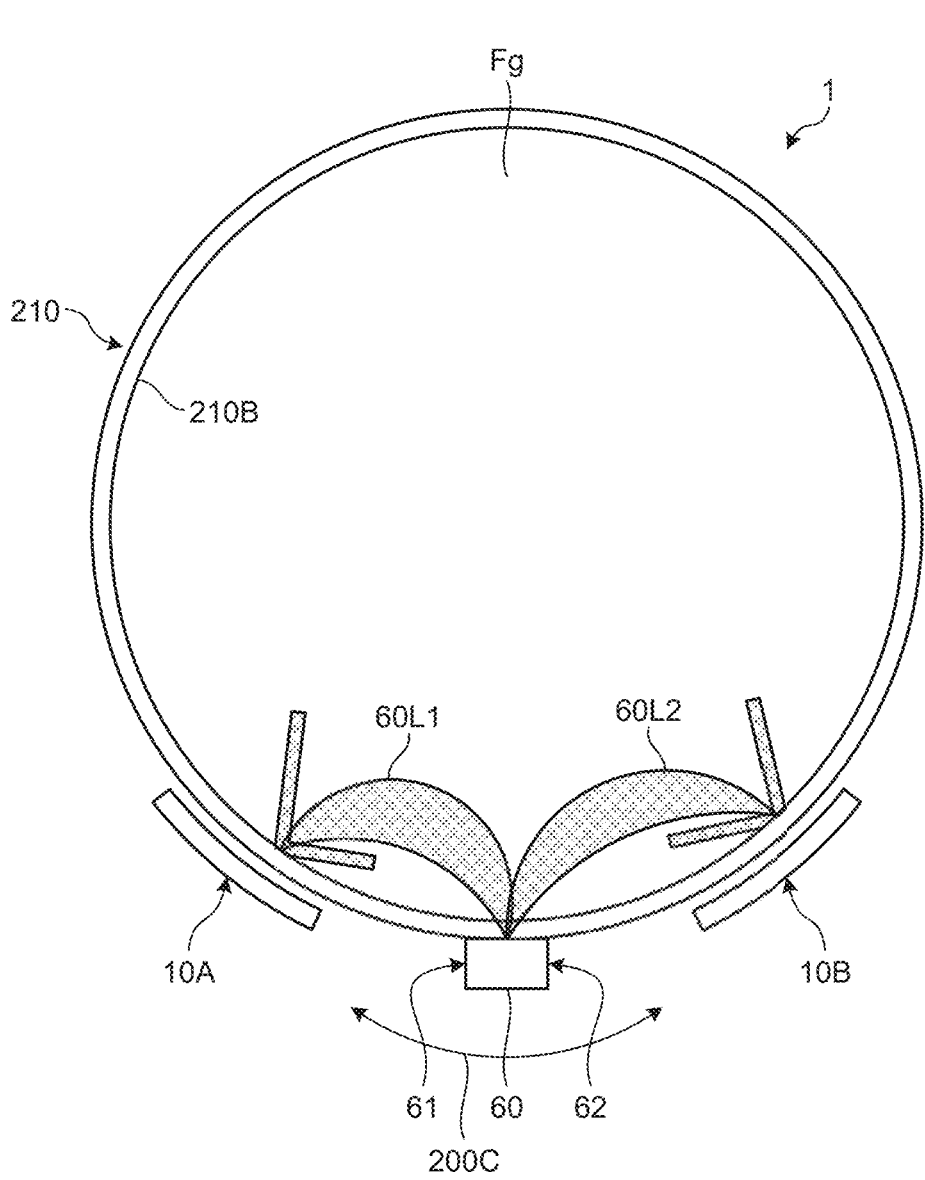
FIG. 7 is a diagram for explaining an optical effect when a finger is accommodated inside the detection device according to the first embodiment.

The following describes an example of detection by the detection device 1 worn on the finger Fg. FIG. 7 is a diagram for explaining an optical effect when the finger is accommodated inside the detection device according to the first embodiment. To simplify the explanation, FIG. 7 illustrates only the first and the second optical sensors 10A and 10B, the light source 60, and a portion of the first housing 210 of the detection device 1, and does not illustrate the other components.

In the example illustrated in FIG. 7, the detection device 1 is in a state where an inner peripheral surface 210B of the first housing 210 of the housing 200 is in contact with or in proximity to the finger Fg. In the detection device 1, when the light source 60 is turned on, the light source 60 emits light toward the finger Fg. The light source 60 emits light 60L1 toward one side in the circumferential direction 200C, and emits light 60L2 toward the other side in the circumferential direction 200C. In the detection device 1, the first optical sensor 10A receives the light 60L1 reflected by the finger Fg, and the second optical sensor 10B receives the light 60L2 reflected by the finger Fg. The detection device 1 detects the information on the living body of the finger Fg based on the amount of light detected by each of the photodiodes PD of the first and the second optical sensors 10A and 10B.

Thus, since the first optical sensor 10A is disposed adjacent to the one end 61 of the light source 60 and the second optical sensor 10B is disposed adjacent to the other end 62 of the light source in the circumferential direction 200C of the housing 200, the detection device 1 can detect the light 60L1 and the light 60L2 of the light source 60. The organic photodiode (OPD) having good light receiving sensitivity is disposed at least at the one end 61 of the light source 60, whereby the detection device 1 can accurately detect the light. Thus, the detection device 1 can receive more light than if the optical sensor is disposed only on one side of the light source 60 in the circumferential direction 200C. Therefore, the amount of reception of the light emitted by the light source 60 can be increased. As a result, the detection device 1 can improve the accuracy of detecting the light from the light source 60 using the ring-shaped housing 200.

The detection device 1 includes the flexible printed circuit board 70 provided with the first optical sensor 10A, the second optical sensor 10B, and the light source 60; and the housing 200 accommodates therein the flexible printed circuit board 70. Thus, the detection device 1 is manufactured such that the housing 200 accommodates therein the flexible printed circuit board 70 where the first optical sensor 10A is adjacent to the one end 61 of the light source 60 and the second optical sensor 10B is adjacent to the other end 62 of the light source. The term "adjacent" includes being adjacent at a desired interval, being adjacent in contact with each other, and the like.

The first and the second optical sensors 10A and 10B of the detection device 1 are the organic photodiodes. Thereby, the detection device 1 can accurately detect the light 60L1 and the light 60L2 of the light source 60.

The detection device 1 has a configuration with the first and the second optical sensors 10A and 10B formed on the sensor substrate 21, and includes the lower electrodes 11, the lower buffer layer 12, the active layer 13, the upper buffer layer 14, the upper electrodes 15, the wiring lines 26, and the insulating layer 27. In the detection device 1, the lower electrodes 11 are electrically coupled to the wiring lines 26, and the wiring lines 26 are electrically coupled to the flexible printed circuit board 70. With this configuration, in the detection device 1, the first and the second optical sensors 10A and 10B can be easily electrically coupled to the flexible printed circuit board 70 by mounting the one sensor substrate 21 on the flexible printed circuit board 70.

In the detection device 1, the sensor substrate 21 has the notch 22 between the first and the second optical sensors 10A and 10B, and the light source 60 is provided in the housing 200 so as to be positioned in the notch 22 of the sensor substrate 21. Thus, by positioning the light source 60 in the notch 22 of the one sensor substrate 21, the first optical sensor 10A can be adjacent to the one end 61 of the light source 60 and the second optical sensor 10B can be adjacent to the other end 62 of the light source. Therefore, the production efficiency can be improved.

In the detection device 1, the sensor substrate 21 includes the joint 23 that is adjacent to the notch 22 and lies between the first and the second optical sensors 10A and 10B, and the second optical sensor 10B includes the lower electrodes 11 of the second optical sensor 10B in the second area 21B of the sensor substrate 21 different from the area for the lower electrodes 11 of the first optical sensor 10A. In the detection device 1, the lower buffer layer 12, the active layer 13, the upper buffer layer 14, and the upper electrode 15 (15A) are arranged at the joint 23. This configuration requires the detection device 1 to only supply power to the integrated upper electrode 15 for the two first and second optical sensors 10A and 10B arranged on opposite sides of the light source 60 in the circumferential direction 200C. Therefore, the configuration can be simplified.

First Modification of First Embodiment

Figure 8:
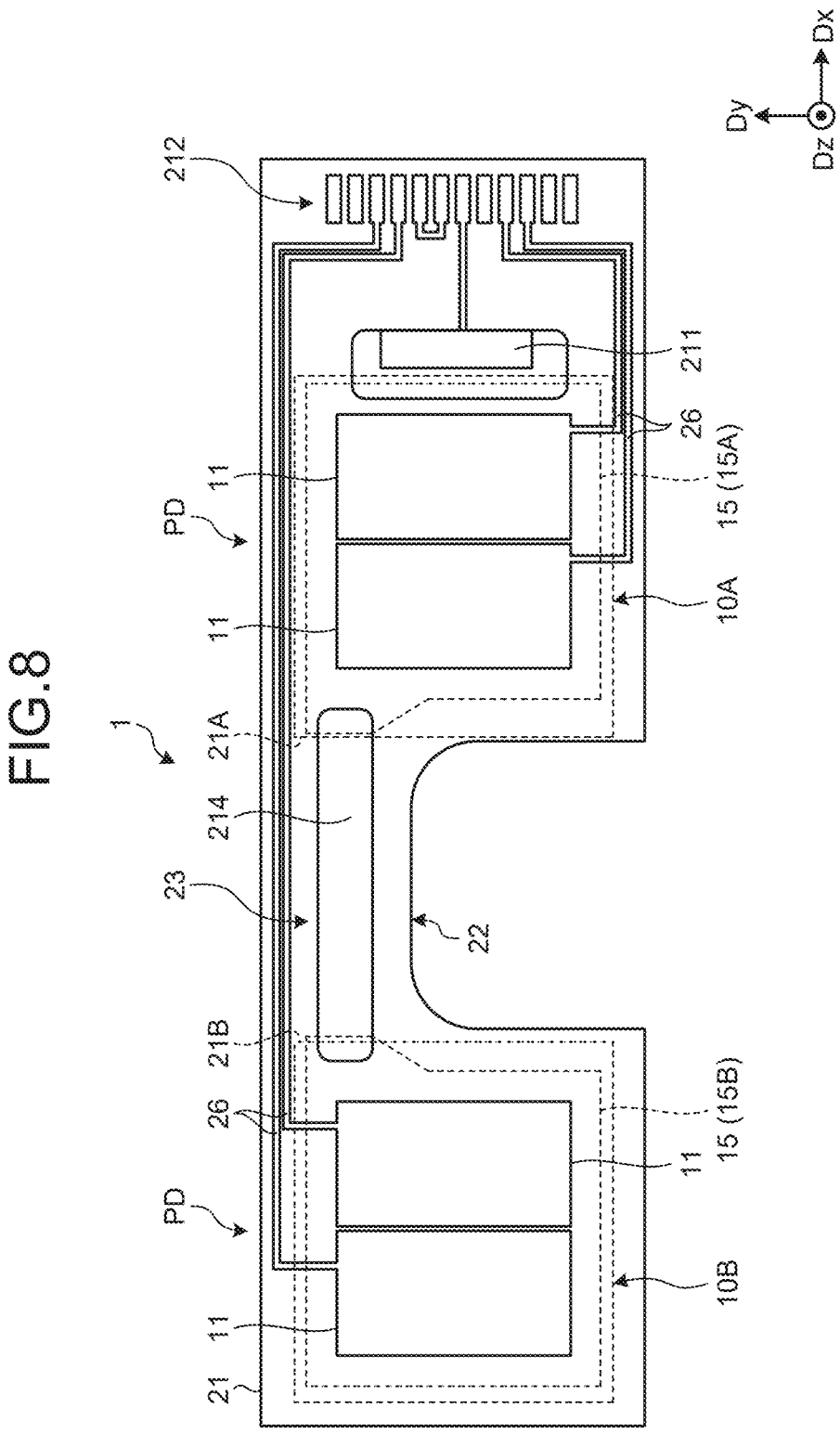
FIG. 8 is a configuration diagram illustrating an exemplary configuration of the first optical sensor and the second optical sensor according to a first modification of the first embodiment.

FIG. 8 is a configuration diagram illustrating an exemplary configuration of the first and the second optical sensors 10A and 10B according to a first modification of the first embodiment. In the first modification of the first embodiment, the following describes a case where the detection device 1 described above includes the first and the second optical sensors 10A and 10B mounted on the sensor substrate 21 illustrated in FIG. 8.

As illustrated in FIG. 8, the first optical sensor 10A has a configuration in which the two lower electrodes 11 and the one upper electrode 15A are stacked together. The second optical sensor 10B has a configuration in which the two lower electrodes 11 arranged in the first direction Dx and the one upper electrode 15B are stacked together. The upper electrode 15 includes the upper electrode 15A of the first optical sensor 10A and the upper electrode 15B of the second optical sensor 10B that are separated by the notch 22 of the sensor substrate 21. The sensor substrate 21 includes the notch 22 and the joint 23, the notch 22 is provided between the first and the second optical sensors 10A and 10B, and the joint 23 is adjacent to the notch 22 and lies between the first and the second optical sensors 10A and 10B. The second optical sensor 10B includes the lower electrodes 11, the lower buffer layer 12, the active layer 13, the upper buffer layer 14, and the upper electrode 15 of the second optical sensor 10B that are provided in the second area 21B of the sensor substrate 21 different from the area for the lower electrodes 11 of the first optical sensor 10A.

The sensor substrate 21 includes a conductive member 214 formed at the joint 23. One end of the conductive member 214 covers the upper electrode 15 of the first optical sensor 10A and at least a side surface of the active layer 13 of the first optical sensor 10A. The other end of the conductive member 214 covers the upper electrode 15 of the second optical sensor 10B and at least a side surface of the active layer 13 of the second optical sensor 10B. In the present embodiment, the conductive member 214 covers side surfaces of the lower buffer layers 12, the active layers 13, and the upper buffer layers 14 of the first and the second optical sensors 10A and 10B. The upper electrode 15A of the first optical sensor 10A is electrically coupled to the upper electrode 15B of the second optical sensor 10B by the conductive member 214.

In the example illustrated in FIG. 8, the first and the second optical sensors 10A and 10B are different from those of the first embodiment described above in that the upper electrodes 15A and 15B are individually formed on the sensor substrate 21. The upper electrode 15A is electrically coupled to the upper electrode 15B by the conductive member 214. On the sensor substrate 21, the conductive member 214 is provided on the upper surface of the joint 23 of the sensor substrate 21 so as to conduct electricity between the upper electrodes 15A and 15B. The conductive member 214 is made of a conductive material.

Thus, in the detection device 1, the upper electrode 15 of the first and the second optical sensors 10A and 10B can be divided into the upper electrode 15A (first electrode) and the upper electrode 15B (second electrode) at the notch 22 of the sensor substrate 21, and the upper electrodes 15A and 15B can be coupled together by the conductive member 214. As a result, in the detection device 1, the first and the second optical sensors 10A and 10B can be individually arranged on opposite sides of the notch 22 of the sensor substrate 21 in the first direction Dx. This configuration makes it easier to change, for example, distance between the first and the second optical sensors 10A and 10B.

Second Modification of First Embodiment

Figure 9:
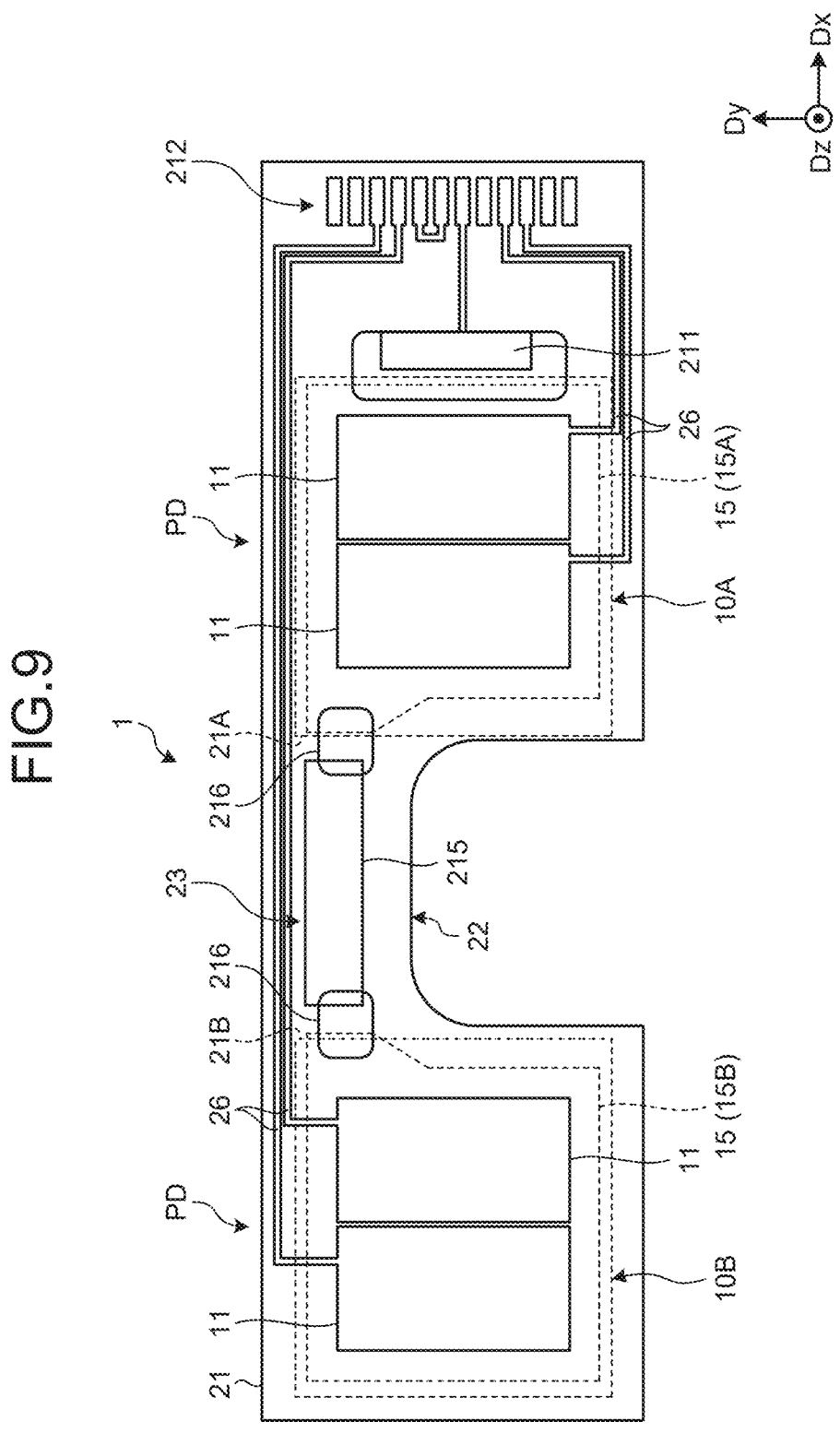
FIG. 9 is a configuration diagram illustrating an exemplary configuration of the first optical sensor and the second optical sensor according to a second modification of the first embodiment.

FIG. 9 is a configuration diagram illustrating an exemplary configuration of the first and the second optical sensors 10A and 10B according to a second modification of the first embodiment. In the second modification of the first embodiment, the following describes a case where the detection device 1 described above includes the first and the second optical sensors 10A and 10B mounted on the sensor substrate 21 illustrated in FIG. 9.

As illustrated in FIG. 9, the first optical sensor 10A has a configuration in which the two lower electrodes 11 and the one upper electrode 15A are stacked together. The second optical sensor 10B has a configuration in which the two lower electrodes 11 arranged in the first direction Dx and the one upper electrode 15B are stacked together. The sensor substrate 21 includes the notch 22 and the joint 23, the notch 22 is provided between the first and the second optical sensors 10A and 10B, and the joint 23 is adjacent to the notch 22 and lies between the first and the second optical sensors 10A and 10B.

The second optical sensor 10B includes the lower electrodes 11, the lower buffer layer 12, the active layer 13, the upper buffer layer 14, and the upper electrode 15 of the second optical sensor 10B that are provided in the second area 21B of the sensor substrate 21 different from the area for the lower electrodes 11 of the first optical sensor 10A. The sensor substrate 21 includes a conductive electrode 215 that is formed at the joint 23 and lies in the same layer as the lower electrode 11 of the first optical sensor 10A, and conductive members 216 formed on opposite ends of the conductive electrode 215. The conductive electrode 215 is formed of a light-transmitting conductive material such as ITO. The conductive electrode 215 supplies power from the upper electrode 15A to the upper electrode 15B. The conductive electrode 215 may be formed on the upper side of the sensor substrate 21 as a layer different from the lower electrode 11.

The conductive members 216 are formed of a conductive material. One of the conductive members 216 covers the upper electrode 15 of the first optical sensor 10A and at least a side surface of the active layer 13 of the first optical sensor 10A. The other of the conductive members 216 covers the upper electrode 15 of the second optical sensor 10B and at least a side surface of the active layer 13 of the second optical sensor 10B. In the present embodiment, the conductive members 216 cover side surfaces of the lower buffer layers 12, the active layers 13, and the upper buffer layers 14 of the first and the second optical sensors 10A and 10B. The upper electrode 15A of the first optical sensor 10A is electrically coupled to the upper electrode 15B of the second optical sensor 10B by the two conductive members 216. In the example illustrated in FIG. 9, the first and the second optical sensors 10A and 10B are different from those of the first embodiment described above in that the upper electrodes 15A and 15B are individually formed on the sensor substrate 21.

Thus, in the detection device 1, the upper electrode 15 of the first and the second optical sensors 10A and 10B can be divided into the upper electrodes 15A and 15B at the notch 22 of the sensor substrate 21, and the upper electrodes 15A and 15B can be coupled by the conductive electrode 215. As a result, in the detection device 1, the first and the second optical sensors 10A and 10B can be individually arranged on opposite sides of the notch 22 of the sensor substrate 21 in the first direction Dx. This configuration makes it easier to change, for example, distance between the first and the second optical sensors 10A and 10B.

Third Modification of First Embodiment

Figure 10:
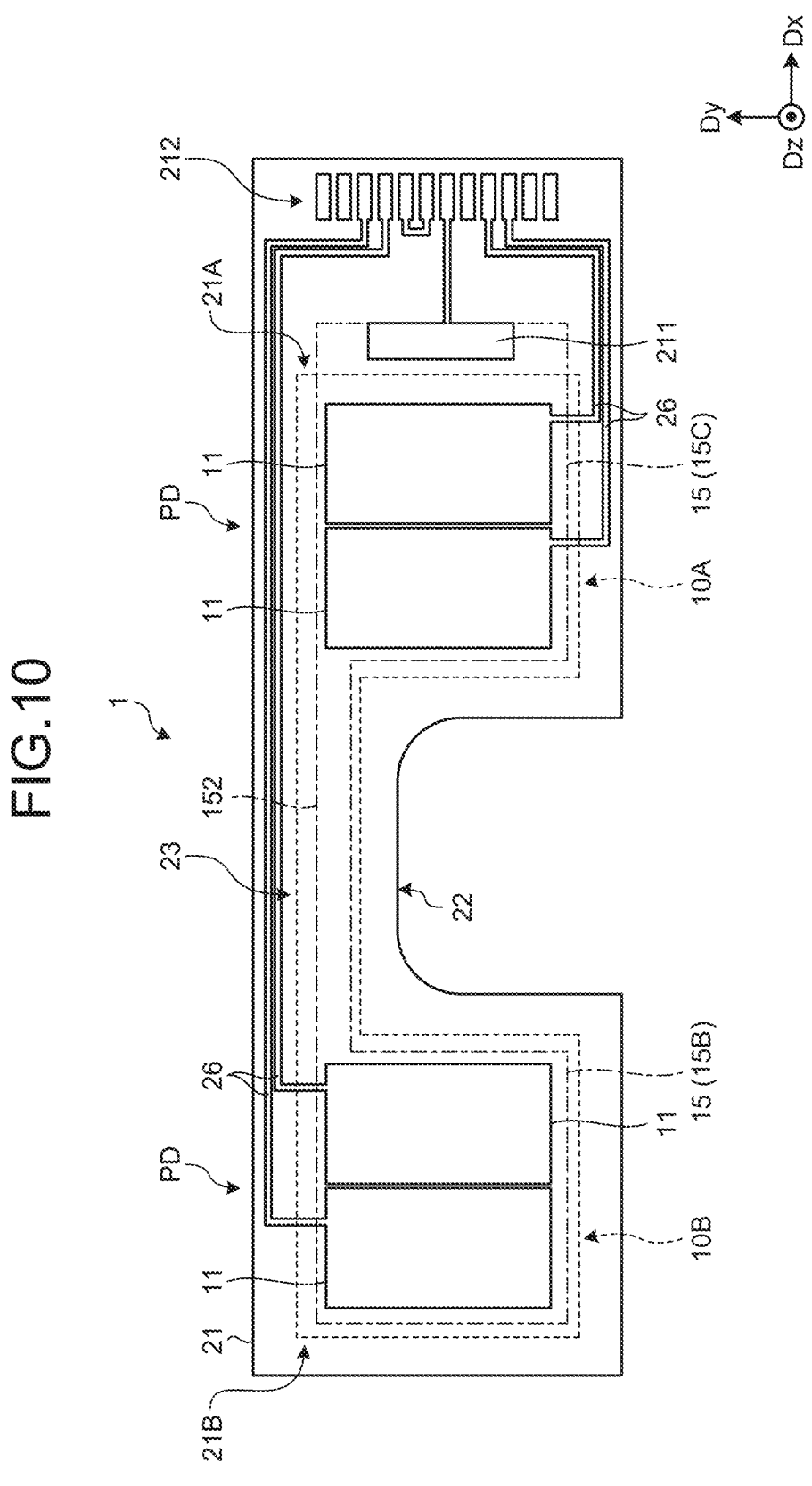
FIG. 10 is a configuration diagram illustrating an exemplary configuration of the first optical sensor and the second optical sensor according to a third modification of the first embodiment.
Figure 11:
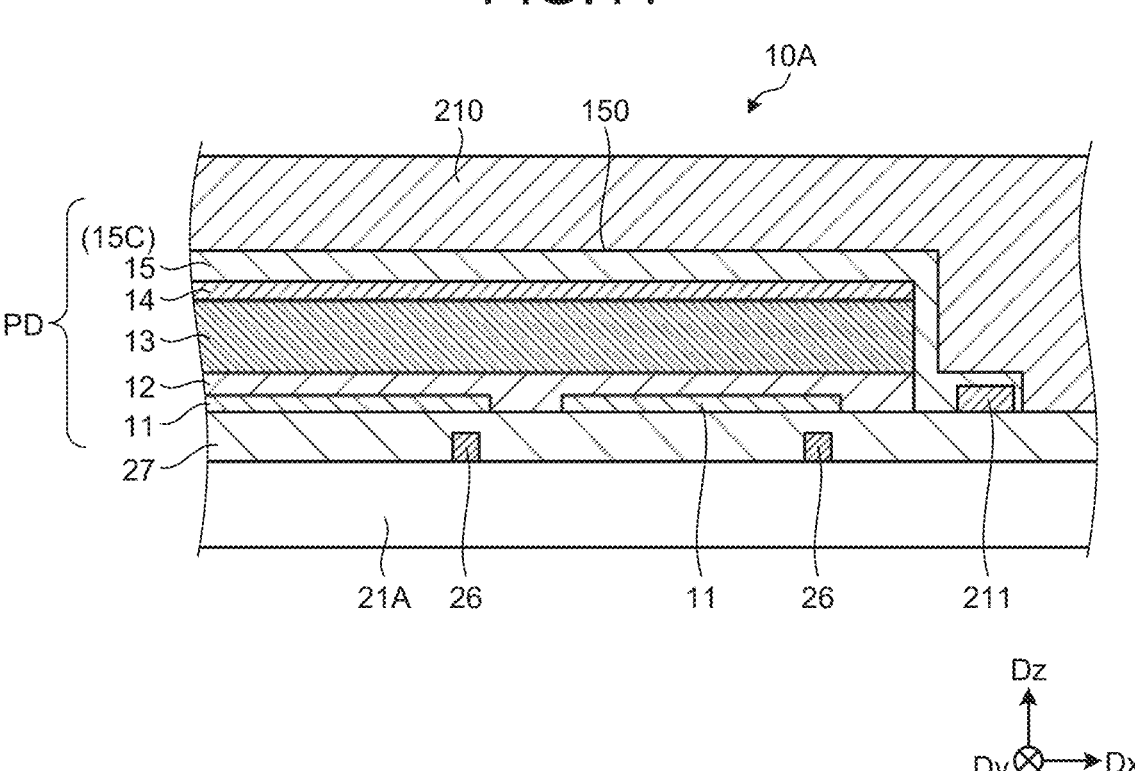
FIG. 11 is a schematic sectional view illustrating an exemplary multilayer configuration of the first optical sensor illustrated in FIG. 10.

FIG. 10 is a configuration diagram illustrating an exemplary configuration of the first and the second optical sensors 10A and 10B according to a third modification of the first embodiment. FIG. 11 is a schematic sectional view illustrating an exemplary multilayer configuration of the first optical sensor illustrated in FIG. 10. In the third modification of the first embodiment, the following describes a case where the detection device 1 described above includes the first and the second optical sensors 10A and 10B mounted on the sensor substrate 21 illustrated in FIG. 10.

As illustrated in FIG. 10, the first optical sensor 10A has a configuration in which the two lower electrodes 11 and one upper electrode 15C are stacked together. The second optical sensor 10B has a configuration in which the two lower electrodes 11 arranged in the first direction Dx and the one upper electrode 15B are stacked together. The sensor substrate 21 includes the notch 22 and the joint 23, the notch 22 is provided between the first and the second optical sensors 10A and 10B, and the joint 23 is adjacent to the notch 22 and lies between the first and the second optical sensors 10A and 10B. The second optical sensor 10B includes the lower electrodes 11 of the second optical sensor 10B in the second area 21B of the sensor substrate 21 different from the area for the lower electrodes 11 of the first optical sensor 10A. The lower electrode 11 of the second optical sensor 10B is an organic photodiode covered with the lower buffer layer 12, the active layer 13, the upper buffer layer 14, and the upper electrode 15.

The sensor substrate 21 is provided with the power supply electrode 211 that is located in the same layer as the lower electrodes 11 of the first optical sensor 10A and is capable of supplying power. The upper electrode 15 includes the upper electrode 15C of the first optical sensor 10A and the upper electrode 15B of the second optical sensor 10B that are electrically coupled by an electrode connector 152 at the notch 22 of the sensor substrate 21. The upper electrode 15C, the upper electrode 15B, and the electrode connector 152 are integrally formed. As illustrated in FIG. 11, the upper electrode 15C covers at least a side surface of the active layer 13 of the first optical sensor 10A and the power supply electrode 211. In the present embodiment, the upper electrode 15C covers side surfaces of the lower buffer layer 12, the active layer 13, the upper buffer layer 14, and power supply electrode 211 of the first optical sensor 10A. At the joint 23, the lower buffer layer 12, the active layer 13, the upper buffer layer 14, and the upper electrode 15 are stacked in this order. The upper electrode 15C is provided in the first area 21A of the sensor substrate 21 so as to cover the two lower electrodes 11 and the power supply electrode 211 of the first optical sensor 10A and is electrically coupled to the power supply electrode 211. The upper electrode 15C is the cathode electrode of the photodiode PD provided on the upper buffer layer 14, in the same way as the upper electrode 15A described above. The upper electrode 15C is formed of a light-transmitting conductive material such as ITO or IZO.

The electrode connector 152 of the upper electrodes 15 faces the insulating layer 27 with the lower buffer layer 12, the active layer 13, and the upper buffer layer 14 interposed therebetween. The first and the second optical sensors 10A and 10B are integrally formed as one sensor. In the first optical sensor 10A, the photodiode PD is well sealed by providing the first housing 210 on the upper electrode 15 and so forth. The upper electrode 15C is electrically coupled to the power supply electrode 211, whereby the number of components can be reduced. When the upper electrode 15C is supplied with power from the power supply electrode 211, the upper electrode 15C supplies the power to the upper electrode 15B via the electrode connector 152.

In the third modification of the first embodiment, the first and the second optical sensors 10A and 10B are different from those of the first embodiment described above in that the upper electrode 15C and the upper electrode 15B are integrally formed, and the upper electrode 15C of the first optical sensor 10A is formed so as to cover the power supply electrode 211.

Thus, in the detection device 1, the upper electrode 15C of the first optical sensor 10A and the upper electrode 15B of the second optical sensor 10B can be integrally formed, and the upper electrodes 15C and 15B can be electrically coupled to the power supply electrode 211 on the sensor substrate 21. As a result, in the detection device 1, the integrated first and second optical sensors 10A and 10B can be arranged on opposite sides of the notch 22 of the sensor substrate 21 in the first direction Dx. This configuration makes it easier to change, for example, distance between the first and the second optical sensors 10A and 10B.

Fourth Modification of First Embodiment

Figure 12:
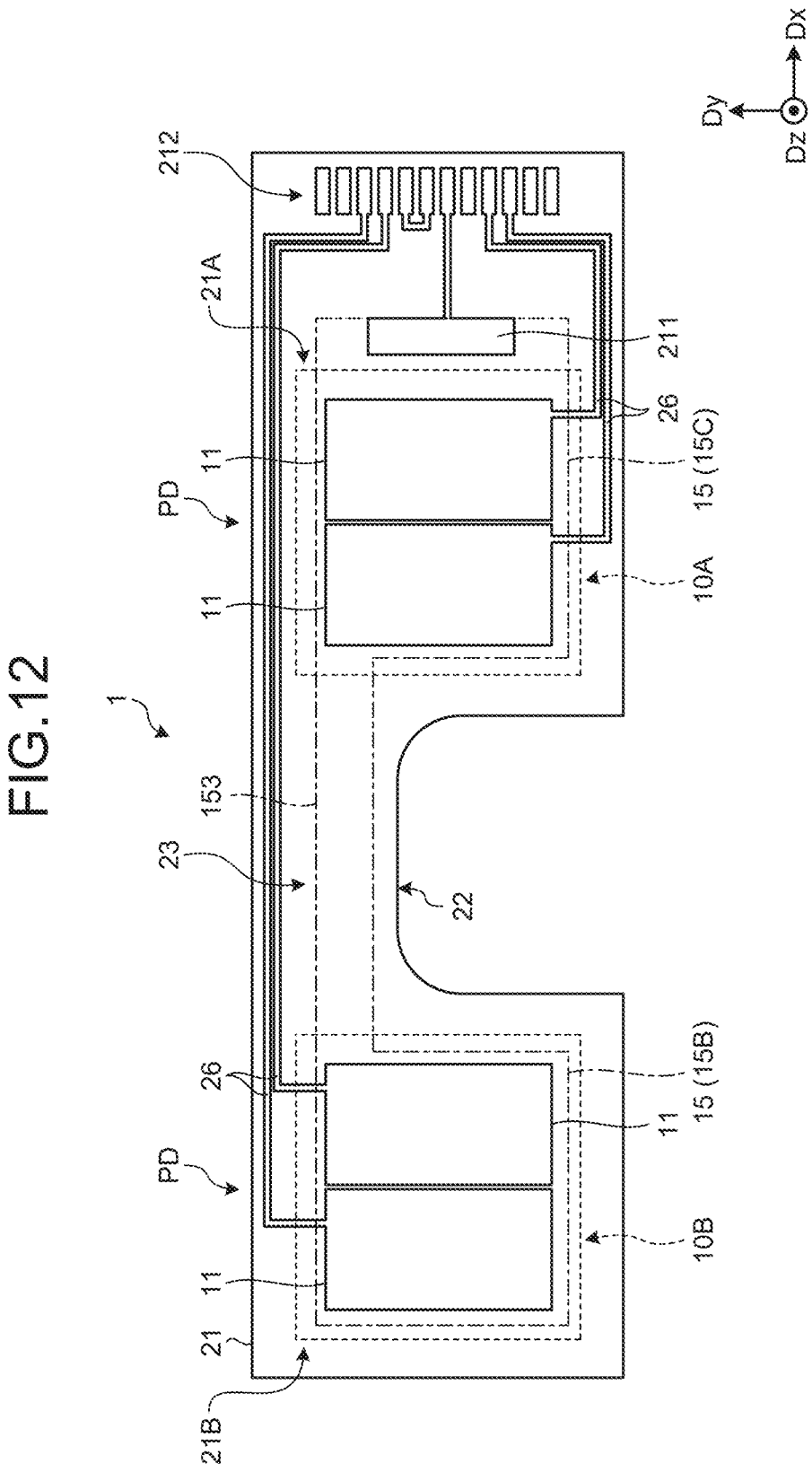
FIG. 12 is a configuration diagram illustrating an exemplary configuration of the first optical sensor and the second optical sensor according to a fourth modification of the first embodiment.

FIG. 12 is a configuration diagram illustrating an exemplary configuration of the first and the second optical sensors 10A and 10B according to a fourth modification of the first embodiment. In the fourth modification of the first embodiment, the following describes a case where the detection device 1 described above includes the first and the second optical sensors 10A and 10B mounted on the sensor substrate 21 illustrated in FIG. 12.

As illustrated in FIG. 12, the sensor substrate 21 includes the notch 22 and the joint 23, the notch 22 is provided between the first and the second optical sensors 10A and 10B, and the joint 23 is adjacent to the notch 22 and lies between the first and the second optical sensors 10A and 10B. The second optical sensor 10B includes the lower electrodes 11, the lower buffer layer 12, the active layer 13, and the upper buffer layer 14 of the second optical sensor 10B that are provided in the second area 21B of the sensor substrate 21 different from the area for the lower electrodes 11 of the first optical sensor 10A. The upper electrode 15 of the first optical sensor 10A covers the joint 23 and the upper buffer layer 14 of the second optical sensor 10B. The upper electrodes 15 of the first and the second optical sensors 10A and 10B are integrally formed and include an electrode connector 153 between the first and the second optical sensors 10A and 10B. The electrode connector 153 faces the insulating layer 27 without the lower buffer layer 12, the active layer 13, and the upper buffer layer 14 described above interposed therebetween. That is, the first and the second optical sensors 10A and 10B are separately formed as two sensors on the sensor substrate 21. In the first and the second optical sensors 10A and 10B, the photodiodes PD are well sealed by providing the first housing 210 on the upper electrodes 15 and so forth. The upper electrode 15C is electrically coupled to the power supply electrode 211, whereby the number of components can be reduced. When the upper electrode 15C is supplied with power from the power supply electrode 211, the upper electrode 15C supplies the power to the upper electrode 15B via the electrode connector 153.

Thus, in the detection device 1, the first and the second optical sensors 10A and 10B are individually formed on the sensor substrate 21; the upper electrode 15C of the first optical sensor 10A and the upper electrode 15B of the second optical sensor 10B are integrally formed; and the upper electrode 15C and the upper electrode 15B can be electrically coupled to the power supply electrode 211. As a result, in the detection device 1, the individual first and second optical sensors 10A and 10B can be arranged on opposite sides of the notch 22 of the sensor substrate 21 in the first direction Dx.

Fifth Modification of First Embodiment

Figure 13:
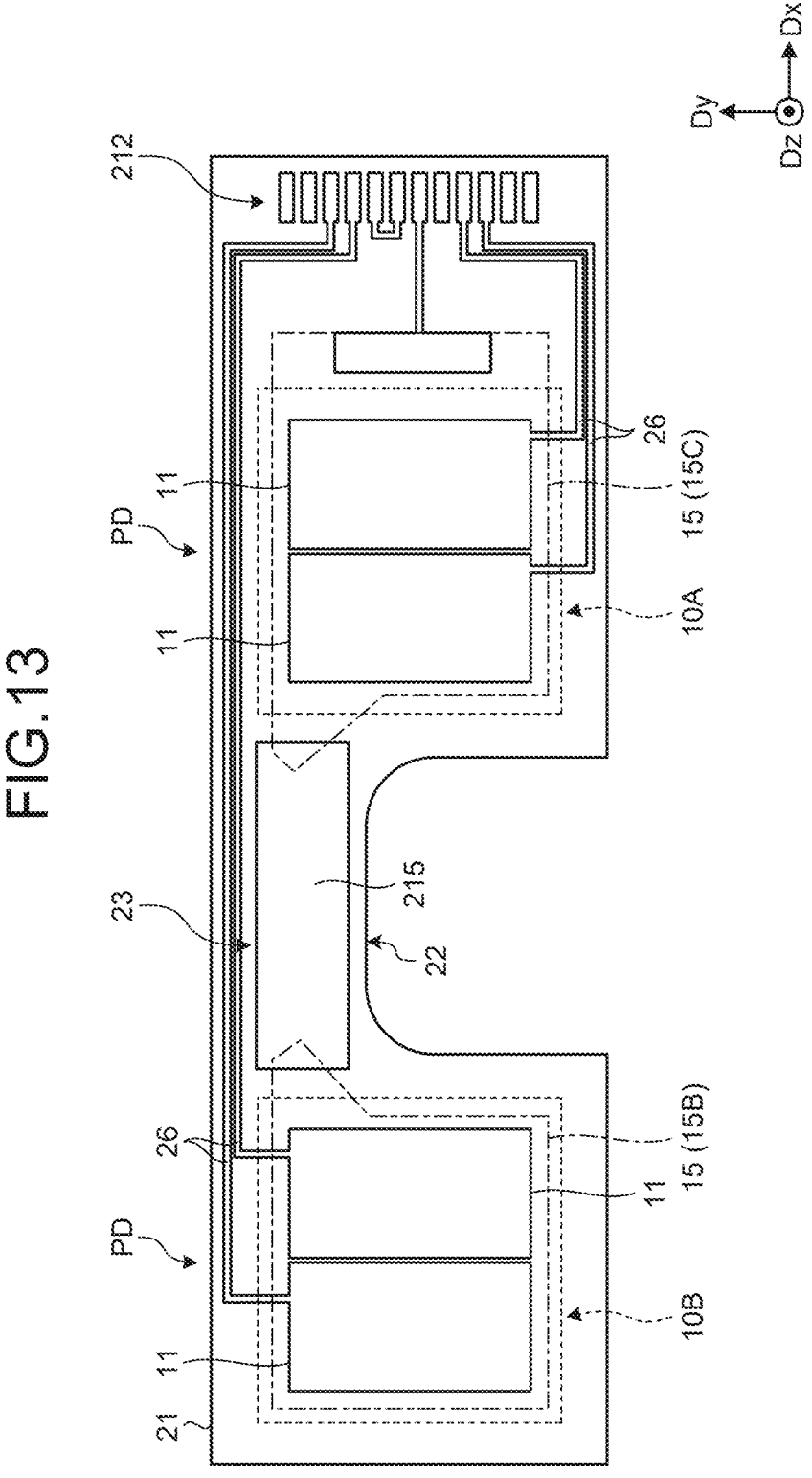
FIG. 13 is a configuration diagram illustrating an exemplary configuration of the first optical sensor and the second optical sensor according to a fifth modification of the first embodiment.

FIG. 13 is a configuration diagram illustrating an exemplary configuration of the first and the second optical sensors 10A and 10B according to a fifth modification of the first embodiment. The first and the second optical sensors 10A and 10B according to the fifth modification of the first embodiment illustrated in FIG. 13 are obtained by modifying the first and the second optical sensors 10A and 10B according to the fourth modification of the first embodiment.

As illustrated in FIG. 13, the sensor substrate 21 includes the notch 22 and the joint 23, the notch 22 is provided between the first and the second optical sensors 10A and 10B, and the joint 23 is adjacent to the notch 22 and lies between the first and the second optical sensors 10A and 10B. The second optical sensor 10B includes the lower electrodes 11, the lower buffer layer 12, the active layer 13, and the upper buffer layer 14, and the upper electrode 15C of the second optical sensor 10B that are provided in the second area 21B of the sensor substrate 21 different from the area for the lower electrodes 11 of the first optical sensor 10A. The sensor substrate 21 includes the conductive electrode 215 that is formed at the joint 23 and located in the same layer as the lower electrodes 11 of the first optical sensor 10A. The conductive electrode 215 is formed of a light-transmitting conductive material such as ITO.

The upper electrode 15C of the first optical sensor 10A is electrically coupled to one end of the conductive electrode 215. The upper electrode 15B of the second optical sensor 10B is electrically coupled to the other end of the conductive electrode 215. The upper electrode 15 includes the upper electrode 15C of the first optical sensor 10A and the upper electrode 15B of the second optical sensor 10B that are separated by the notch 22 of the sensor substrate 21. In the example illustrated in FIG. 13, the upper electrodes 15C and 15B are individually formed for the first and the second optical sensors 10A and 10B. The conductive electrode 215 supplies power from the upper electrode 15C to the upper electrode 15B.

Thus, in the detection device 1, the upper electrode 15 of the first and the second optical sensors 10A and 10B can be divided into the upper electrodes 15C and 15B at the notch 22 of the sensor substrate 21, and the upper electrodes 15A and 15B can be coupled by the conductive electrode 215. As a result, in the detection device 1, the first and second optical sensors 10A and 10B can be individually arranged on opposite sides of the notch 22 of the sensor substrate 21 in the first direction Dx.

Second Embodiment

Figure 14:
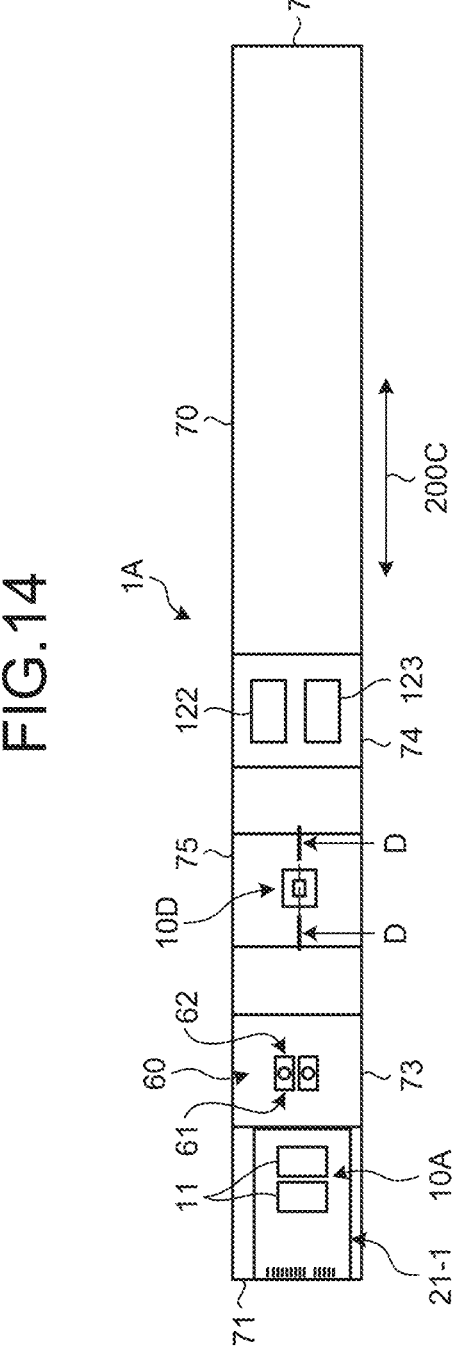
FIG. 14 is a development view illustrating an exemplary development of optical sensors of a detection device according to a second embodiment.

FIG. 14 is a development view illustrating an exemplary development of optical sensors of a detection device according to a second embodiment. A detection device 1A illustrated in FIG. 14 includes the housing 200, the light source 60, the first optical sensor 10A, and a second optical sensor 10D, similarly to the detection device 1 of the first embodiment. That is, the detection device 1A differs from the first embodiment in including the second optical sensor 10D. The detection device 1A is a device that is operated by power from the power supply circuit 123. The detection device 1A includes the flexible printed circuit board 70 on which the first and the second optical sensors 10A and 10D are mounted.

As illustrated in FIG. 14, the flexible printed circuit board 70 is formed into a deformable band shape and is formed into a ring shape by coupling the one end 71 to the other end 72. The flexible printed circuit board 70 has the first mounting area 73, the second mounting area 74, and a third mounting area 75. The first mounting area 73 is the area where the light source 60 and so forth are mounted. The second mounting area 74 is the area where the control circuit 122, the power supply circuit 123, and so forth are mounted. The third mounting area 75 is an area where the second optical sensor 10D and so forth are mounted and is provided on the other end 62 side of the light source 60. A predetermined gap is provided between the first mounting area 73 and the third mounting area 75. On the flexible printed circuit board 70, a sensor substrate 21-1 is mounted on the one end 61 side of the light source 60 in the first mounting area 73. In the flexible printed circuit board 70, the light source 60, the first optical sensor 10A, the second optical sensor 10D, and so forth are electrically coupled to the control circuit 122.

In the present embodiment, the first and the second optical sensors 10A and 10D are provided so as to interpose the light source 60 therebetween in the circumferential direction 200C. That is, in the detection device 1A, the first optical sensor 10A, the light source 60, and the second optical sensor 10D are arranged in this order in the circumferential direction 200C. The first and the second optical sensors 10A and 10D are arranged so as to interpose the light source 60 therebetween in the circumferential direction 200C. Thereby, the light emitted by the light source 60 can be detected over a wide area of the housing 200.

The sensor substrate 21-1 is an insulating substrate and is formed of, for example, a film-like resin and formed into a band shape. The sensor substrate 21-1 is a deformable substrate on which the first optical sensor 10A is mounted. When the sensor substrate 21-1 is mounted on the flexible printed circuit board 70, the first optical sensor 10A is positioned on the one end 61 side of the light source 60 in the circumferential direction 200C of the housing 200. The first optical sensor 10A is mounted on the sensor substrate 21-1. The sensor substrate 21-1 has the same configuration as the first area 21A of the sensor substrate 21 of the first embodiment described above.

The second optical sensor 10D is a silicon photodiode and is a detector using an internal photoelectric effect. The second optical sensor 10D detects the light emitted by the light source 60 and reflected by the finger Fg, light directly incident on the second optical sensor, and other light. The second optical sensor 10D is provided in the housing 200 so as to be adjacent to the other end 62 of the light source 60 in the circumferential direction 200C of the housing 200. In the same way as in the first embodiment, the first optical sensor 10A that is an organic photodiode is provided in the housing 200 so as to be adjacent to the one end 61 of the light source 60 in the circumferential direction 200C of the housing 200.

Figure 15:
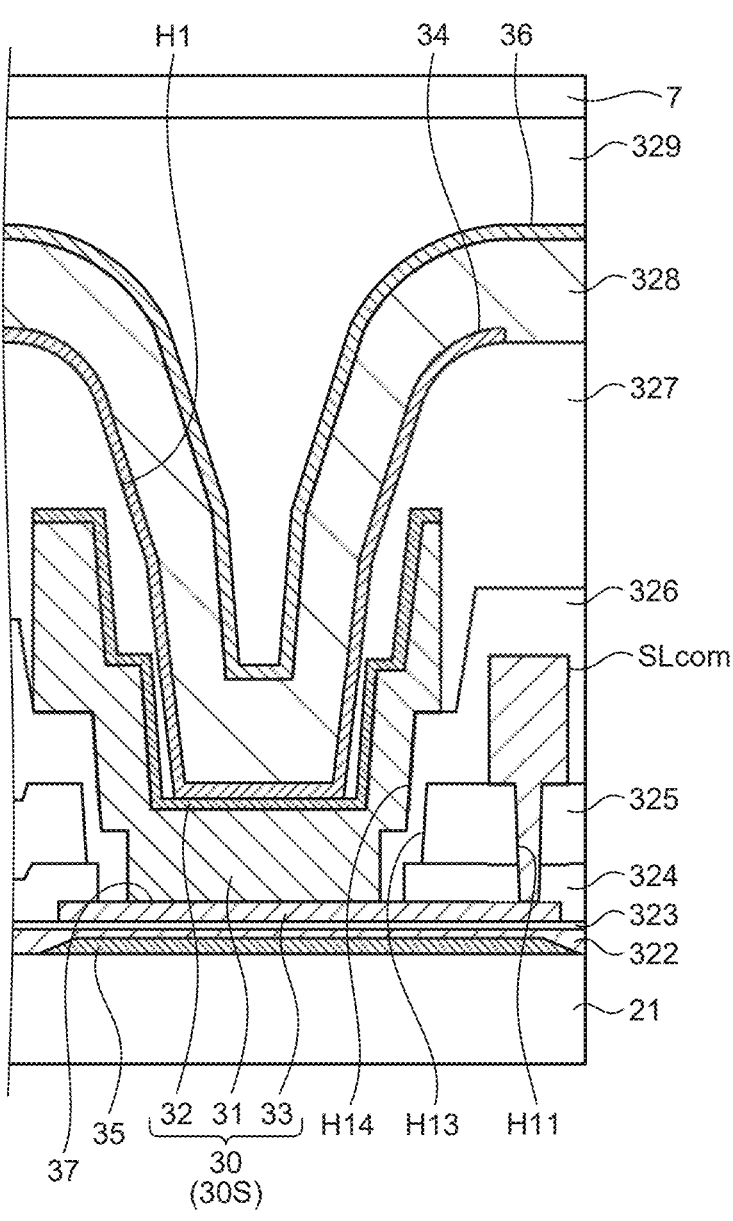
FIG. 15 is a schematic sectional view taken along section D-D illustrated in FIG. 14.

FIG. 15 is a schematic sectional view taken along section D-D illustrated in FIG. 14. As illustrated in FIG. 15, the second optical sensor 10D is a photodiode 30 and includes a plurality of partial photodiodes 30S. Insulating films 322 and 323 are provided on a lower conductive layer 35. A coupling line SLcn is coupled to a gate line through a contact hole penetrating an insulating film 325 from the insulating film 322. The photodiode 30 is provided on the insulating film 323, and the lower conductive layer 35 is provided between the sensor substrate 21 and a p-type semiconductor layer 33. The lower conductive layer 35 serves as a light-blocking layer and can reduce light entering the photodiode 30 from the sensor substrate 21 side.

An i-type semiconductor layer 31 is provided between the p-type semiconductor layer 33 and an n-type semiconductor layer 32 in the third direction Dz. In the present embodiment, the p-type semiconductor layer 33, the i-type semiconductor layer 31, and the n-type semiconductor layer 32 are stacked in this order on the insulating film 323.

Specifically, the p-type semiconductor layer 33 is provided on the insulating film 323. Insulating films 324, 325, and 326 are provided so as to cover the p-type semiconductor layer 33. A contact hole H13 is provided in the insulating films 324 and 325 at a location overlapping the p-type semiconductor layer 33. The insulating film 326 covers side surfaces of the insulating films 324 and 325 that form the inner wall of the contact hole H13. The insulating film 326 is provided with a contact hole H14 at a location overlapping the p-type semiconductor layer 33. The i-type semiconductor layer 31 is provided on the insulating film 326 and is coupled to the p-type semiconductor layer 33 through the contact hole H14 penetrating the insulating film 326 from the insulating film 324. The n-type semiconductor layer 32 is provided on the i-type semiconductor layer 31.

An insulating layer 327 is provided on the insulating film 326 so as to cover the photodiode 30. The insulating layer 327 is provided in direct contact with the photodiode 30 and the insulating film 326. The insulating layer 327 is made of an organic material such as a photosensitive acrylic. The insulating layer 327 is thicker than the insulating film 326. The insulating layer 327 has a better coverage for unevenness in height than inorganic insulating materials and is provided so as to cover the side surfaces of the i-type semiconductor layer 31 and the n-type semiconductor layer 32.

An upper conductive layer 34 is provided on the insulating layer 327. The upper conductive layer 34 is made of a light-transmitting conductive material such as indium tin oxide (ITO). The upper conductive layer 34 is provided along a surface of the insulating layer 327 and is coupled to the n-type semiconductor layer 32 through a contact hole H1 provided in the insulating layer 327.

An insulating film 328 is provided on the insulating layer 327 so as to cover the upper conductive layer 34. The insulating film 328 is an inorganic insulating film. The insulating film 328 is provided as a protective layer for reducing water entering the photodiode 30. An overlapping conductive layer 36 is provided on an insulating film 328. The overlapping conductive layer 36 is made of a light-transmitting conductive material such as ITO. The overlapping conductive layer 36 may be omitted.

A protective film 329 is provided above the insulating film 328 so as to cover the overlapping conductive layer 36. The protective film 329 is an organic protective film. The protective film 329 is formed so as to planarize a surface of the detection device 1A. An optical filter 7 is provided on the protective film 329.

The sectional configuration of the photodiode 30 illustrated in FIG. 15 is not limited to this example. For example, the photodiode 30 may be provided in a different layer from each transistor, and the p-type semiconductor layer 33, the i-type semiconductor layer 31, and the n-type semiconductor layer 32 may be stacked in this order on the insulating film 326.

The light emitted from the light source 60 is reflected by the surface of the object to be detected, such as the finger Fg, and enters the first and the second optical sensors 10A and 10D. As a result, the detection device 1A can detect the fingerprint by detecting the shape of the asperities on the surface of the finger Fg or the like. Alternatively, the light emitted from the light source 60 may be reflected in the finger Fg or the like, or transmitted through the finger Fg or the like, and enter the photodiodes PD. The detection device 1A can thereby detect the information on the living body in the finger Fg or the like.

For example, the first optical sensor 10A that is an organic photodiode can accurately measure the pulse waves in a large area using a plurality of pixels, but may fail to make the measurement due to noise such external light. In the present embodiment, the detection device 1A having a silicon photodiode as the second optical sensor 10D can make the measurement by switching to the second optical sensor 10D when the measurement using the first optical sensor 10A is not preferable, or by using only the second optical sensor 10D. Thus, the detection device 1A can detect the information on the living body with a reduced influence of noise by combining the organic photodiode with the silicon photodiode.

Modification of Second Embodiment

Figure 16:
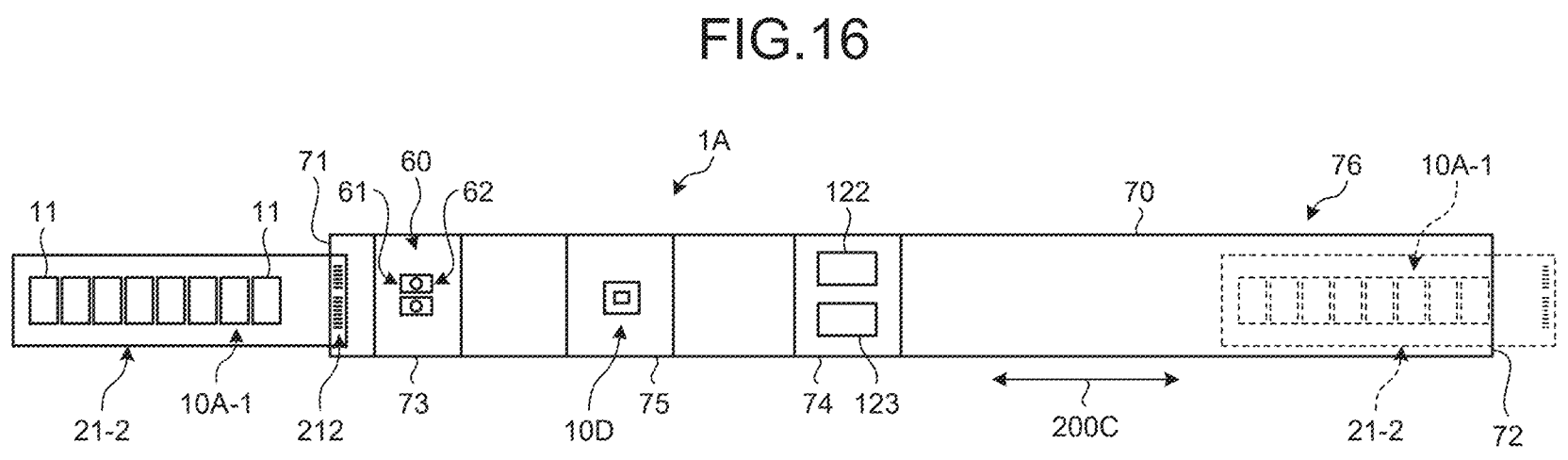

FIG. 16 is a configuration diagram illustrating an exemplary configuration of a first optical sensor 10A-1 and the second optical sensor 10D according to a modification of the second embodiment. The detection device 1A illustrated in FIG. 16 is a modification of the detection device 1A illustrated in FIG. 14, and the configuration of the first optical sensor 10A-1 differs from that of the first optical sensor 10A.

In the example illustrated in FIG. 16, the first optical sensor 10A-1 has a configuration in which eight lower electrodes 11 and one upper electrode 15A are stacked, and differs in the number of the lower electrodes 11 from the first optical sensor 10A described above. In the present embodiment, a case will be described of the first optical sensor 10A-1 where the number of the lower electrodes 11 is increased from two in the first embodiment to eight, but the number of lower electrodes 11 is not limited thereto.

On the flexible printed circuit board 70, a sensor substrate 21-2 is mounted on the one end 61 side of the light source 60 in the first mounting area 73. In the flexible printed circuit board 70, the light source 60, the first optical sensor 10A, the second optical sensor 10D, and so forth are electrically coupled to the control circuit 122.

In the present embodiment, the first and the second optical sensors 10A-1 and 10D are provided so as to interpose the light source 60 therebetween in the circumferential direction 200C. That is, in the detection device 1A, the first optical sensor 10A-1, the light source 60, and the second optical sensor 10D are arranged in this order in the circumferential direction 200C. The first and the second optical sensors 10A-1 and 10D are arranged so as to interpose the light source 60 therebetween in the circumferential direction 200C, whereby the light emitted by the light source 60 can be detected over a wide area of the housing 200.

The sensor substrate 21-2 is an insulating substrate and is formed of, for example, a film-like resin and formed into a band shape. The sensor substrate 21-2 is a deformable substrate on which the first optical sensor 10A is mounted. An end of the sensor substrate 21-2 near the coupler 212 is attached to the flexible printed circuit board 70. When the flexible printed circuit board 70 is formed into a ring shape, the sensor substrate 21-2 is positioned and mounted in a mounting area 76 of the flexible printed circuit board 70. In the present embodiment, by arranging the eight lower electrodes 11 along the circumferential direction 200C on the sensor substrate 21-2, the first optical sensor 10A-1 can detect light in a wider area than the first optical sensor 10A in which the two lower electrodes 11 are arranged in the circumferential direction 200C.

In the detection device 1A, the first optical sensor 10A-1 is positioned on the one end 61 side of the light source 60, and the second optical sensor 10D is positioned on the other end 62 side of the light source 60, in the circumferential direction 200C of the housing 200.

The light emitted from the light source 60 is reflected by the surface of the object to be detected, such as the finger Fg, and enters the first and the second optical sensors 10A-1 and 10D. As a result, the detection device 1A can detect the fingerprint by detecting the shape of the asperities on the surface of the finger Fg or the like. Alternatively, the light emitted from the light source 60 may be reflected in the finger Fg or the like, or transmitted through the finger Fg or the like, and enter the photodiodes PD. Thereby, the detection device 1A can accurately detect the information on the living body in the finger Fg or the like.

Thus, in the detection device 1A, the upper electrodes 15 of the first and the second optical sensors 10A-1 and 10D can be arranged on opposite sides of the light source 60. In the detection device 1A, the first optical sensor 10A-1 can be disposed over a wide area in the circumferential direction 200C of the housing 200. Thus, the first and the second optical sensors 10A-1 and 10D can accurately detect the amount of light even if the position, state, and the like of the detection device 1A on the finger Fg vary.

The control circuit 122 of the detection device 1A according to the second embodiment may detect the information on the living body in the finger Fg or the like using the first and the second optical sensors 10A-1 and 10D, or switching between the first and the second optical sensors 10A-1 and 10D. For example, the control circuit 122 may detect the amount of light by alternately using the first and the second optical sensors 10A-1 and 10D, and determine a sensor to be used for detection based on the detected amount of light.

The components in the embodiments described above can be combined as appropriate. Other operational advantages accruing from the aspects described in the embodiments of the present invention that are obvious from the description herein, or that are conceivable as appropriate by those skilled in the art will naturally be understood as accruing from the present invention.

What is claimed is:

1. A detection device comprising:
a ring-shaped housing;
a light source provided in the housing;
a first optical sensor provided in the housing so as to be adjacent to one end of the light source in a circumferential direction of the housing; and
a second optical sensor provided in the housing so as to be adjacent to the other end of the light source in the circumferential direction of the housing, wherein
at least the first optical sensor is an organic photodiode comprising a sensor substrate, a lower electrode, a lower buffer layer, an active layer, an upper buffer layer, and an upper electrode, and
the sensor substrate includes:
  a first side along a longitudinal direction of the sensor substrate, the first side including a joint to join two ends of the sensor substrate in the longitudinal direction; and
  a second side along a longitudinal direction of the sensor substrate, the second side being cut to have a notch having a curved shape.

2. The detection device according to claim 1, comprising a flexible printed circuit board provided with the first optical sensor, the second optical sensor, and the light source, wherein
the housing internally accommodates the flexible printed circuit board.

3. The detection device according to claim 2, wherein
the second optical sensor is an organic photodiode comprising a lower electrode of the second optical sensor in an area of the sensor substrate different from an area for the lower electrode of the first optical sensor, and
the lower electrode of the second optical sensor is covered with the lower buffer layer, the active layer, the upper buffer layer, and the upper electrode.

4. The detection device according to claim 3, further comprising a plurality of wiring lines, wherein
the lower electrode of the first optical sensor and the lower electrode of the second optical sensor are each electrically coupled to the wiring lines, and the wiring lines are electrically coupled to the flexible printed circuit board.

5. The detection device according to claim 4, wherein
the sensor substrate comprises the notch between the first optical sensor and the second optical sensor, and
the light source is provided in the housing so as to be positioned in the notch of the sensor substrate.

6. A detection device comprising:
a ring-shaped housing;
a light source provided in the housing;
a first optical sensor provided in the housing so as to be adjacent to one end of the light source in a circumferential direction of the housing; and
a second optical sensor provided in the housing so as to be adjacent to the other end of the light source in the circumferential direction of the housing, wherein
at least the first optical sensor is an organic photodiode comprising a sensor substrate, a lower electrode, a lower buffer layer, an active layer, an upper buffer layer, and an upper electrode,
the sensor substrate comprises a notch and a joint, the notch is provided between the first optical sensor and the second optical sensor, and the joint is adjacent to the notch and lies between the first optical sensor and the second optical sensor,
the second optical sensor is an organic photodiode comprising a lower electrode of the second optical sensor in an area of the sensor substrate different from an area for the lower electrode of the first optical sensor,
the lower electrode of the second optical sensor is covered with the lower buffer layer, the active layer, the upper buffer layer, and the upper electrode, and
the lower buffer layer, the active layer, the upper buffer layer, and the upper electrode are arranged at the joint.

7. A detection device comprising:
a ring-shaped housing;
a light source provided in the housing;
a first optical sensor provided in the housing so as to be adjacent to one end of the light source in a circumferential direction of the housing; and
a second optical sensor provided in the housing so as to be adjacent to the other end of the light source in the circumferential direction of the housing, wherein
at least the first optical sensor is an organic photodiode comprising a sensor substrate, a lower electrode, a lower buffer layer, an active layer, an upper buffer layer, and an upper electrode,
the sensor substrate comprises a notch and a joint, the notch is provided between the first optical sensor and the second optical sensor, and the joint is adjacent to the notch and lies between the first optical sensor and the second optical sensor,
the second optical sensor comprises a lower electrode, a lower buffer layer, an active layer, an upper buffer layer, and an upper electrode of the second optical sensor that are provided in an area of the sensor substrate different from an area for the lower electrode of the first optical sensor,
the sensor substrate comprises a conductive member formed at the joint,
one end of the conductive member covers the upper electrode of the first optical sensor and at least a side surface of the active layer of the first optical sensor, and the other end of the conductive member covers the upper electrode of the second optical sensor and at least a side surface of the active layer of the second optical sensor, and the upper electrode of the first optical sensor is electrically coupled to the upper electrode of the second optical sensor by the conductive member.

8. A detection device comprising:

a ring-shaped housing;

a light source provided in the housing;

a first optical sensor provided in the housing so as to be adjacent to one end of the light source in a circumferential direction of the housing; and a second optical sensor provided in the housing so as to be adjacent to the other end of the light source in the circumferential direction of the housing, wherein at least the first optical sensor is an organic photodiode comprising a sensor substrate, a lower electrode, a lower buffer layer, an active layer, an upper buffer layer, and an upper electrode, the sensor substrate comprises a notch and a joint, the notch is provided between the first optical sensor and the second optical sensor, and the joint is adjacent to the notch and lies between the first optical sensor and the second optical sensor, the second optical sensor comprises a lower electrode, a lower buffer layer, an active layer, an upper buffer layer, and an upper electrode of the second optical sensor that are provided in an area of the sensor substrate different from an area for the lower electrode of the first optical sensor, the sensor substrate comprises a conductive electrode and conductive members, the conductive electrode is formed at the joint and lies in the same layer as the lower electrode of the first optical sensor, and the conductive members are formed on opposite ends of the conductive electrode, one of the conductive members covers the upper electrode of the first optical sensor and at least a side surface of the active layer of the first optical sensor, and the other of the conductive members covers the upper electrode of the second optical sensor and at least a side surface of the active layer of the second optical sensor, and the upper electrode of the first optical sensor is electrically coupled to the upper electrode of the second optical sensor by the two conductive members and the conductive electrode.

9. A detection device comprising:

a ring-shaped housing;

a light source provided in the housing;

a first optical sensor provided in the housing so as to be adjacent to one end of the light source in a circumferential direction of the housing; and a second optical sensor provided in the housing so as to be adjacent to the other end of the light source in the circumferential direction of the housing, wherein at least the first optical sensor is an organic photodiode comprising a sensor substrate, a lower electrode, a lower buffer layer, an active layer, an upper buffer layer, and an upper electrode, the sensor substrate comprises a notch and a joint, the notch is provided between the first optical sensor and the second optical sensor, and the joint is adjacent to the notch and lies between the first optical sensor and the second optical sensor, the second optical sensor is an organic photodiode comprising a lower electrode of the second optical sensor in an area of the sensor substrate different from an area for the lower electrode of the first optical sensor, and the lower electrode of the second optical sensor is covered with the lower buffer layer, the active layer, the upper buffer layer, and the upper electrode, the sensor substrate comprises a power supply electrode that is provided in the same layer as the lower electrode of the first optical sensor and is capable of supplying power, the upper electrode covers at least a side surface of the active layer of the first optical sensor and the power supply electrode, and the lower buffer layer, the active layer, the upper buffer layer, and the upper electrode are arranged at the joint.

10. A detection device comprising:

a ring-shaped housing;

a light source provided in the housing;

a first optical sensor provided in the housing so as to be adjacent to one end of the light source in a circumferential direction of the housing; and a second optical sensor provided in the housing so as to be adjacent to the other end of the light source in the circumferential direction of the housing, wherein at least the first optical sensor is an organic photodiode comprising a sensor substrate, a lower electrode, a lower buffer layer, an active layer, an upper buffer layer, and an upper electrode, the sensor substrate comprises a notch and a joint, the notch is provided between the first optical sensor and the second optical sensor, and the joint is adjacent to the notch and lies between the first optical sensor and the second optical sensor, the second optical sensor comprises a lower electrode, a lower buffer layer, an active layer, and an upper buffer layer of the second optical sensor that are provided in an area of the sensor substrate different from an area for the lower electrode of the first optical sensor, and the upper electrode of the first optical sensor covers the joint and the upper buffer layer of the second optical sensor.

11. A detection device comprising:

a ring-shaped housing;

a light source provided in the housing;

a first optical sensor provided in the housing so as to be adjacent to one end of the light source in a circumferential direction of the housing; and a second optical sensor provided in the housing so as to be adjacent to the other end of the light source in the circumferential direction of the housing, wherein at least the first optical sensor is an organic photodiode comprising a sensor substrate, a lower electrode, a lower buffer layer, an active layer, an upper buffer layer, and an upper electrode, the sensor substrate comprises a notch and a joint, the notch is provided between the first optical sensor and the second optical sensor, and the joint is adjacent to the notch and lies between the first optical sensor and the second optical sensor, the second optical sensor comprises a lower electrode, a lower buffer layer, an active layer, an upper buffer layer, and an upper electrode of the second optical sensor provided in an area of the sensor substrate different from an area for the lower electrode of the first optical sensor, the sensor substrate comprises a conductive electrode that is formed at the joint and provided in the same layer as the lower electrode of the first optical sensor, the upper electrode of the first optical sensor is electrically coupled to one end of the conductive electrode, and the upper electrode of the second optical sensor is electrically coupled to the other end of the conductive electrode.

12. The detection device according to claim 2, wherein the second optical sensor is a silicon photodiode.

13. The detection device according to claim 1, wherein the light source emits any of near-infrared light, red light, and green light.

* * * * *